United States Patent [19]

Iida et al.

[11] Patent Number: 4,666,285
[45] Date of Patent: May 19, 1987

[54] ELECTROSTATIC COPYING APPARATUS

[75] Inventors: Kazumi Iida, Matsubara; Yosuke Ohata, Habikino; Keiichiro Hyodo, Kobe; Kazunori Akiyama, Takatsuki; Tadashi Umeda, Yamato Takada; Keiichi Kishimoto, Nara, all of Japan

[73] Assignee: Mita Industrial Co., Ltd., Osaka, Japan

[21] Appl. No.: 876,586

[22] Filed: Jun. 20, 1986

Related U.S. Application Data

[62] Division of Ser. No. 596,121, Apr. 3, 1984, Pat. No. 4,636,057.

[30] Foreign Application Priority Data

Apr. 12, 1983 [JP] Japan ................................. 58-63051

[51] Int. Cl.$^4$ ............................................ G03G 15/00
[52] U.S. Cl. ...................................... 355/8; 355/3 R; 355/14 R
[58] Field of Search ................... 355/3 R, 8, 14 R, 56, 355/14 SH

[56] References Cited

U.S. PATENT DOCUMENTS 4,277,163  7/1981  Ikesue et al. ................... 355/14 R
4,533,233  8/1985  Kimura et al. ...................... 355/8

Primary Examiner—A. C. Prescott
Attorney, Agent, or Firm—Beveridge, DeGrandi & Weilacher

[57] ABSTRACT

An electrostatic copying apparatus comprising a lower supporting frame, an upper supporting frame mounted on the lower supporting frame for pivotal movement between an open position and a closed position, a document placing means having a transparent plate for placing a document to be copied thereon, an optical unit and a driving source. Either the document placing means or at least a part of the optical unit is mounted reciprocally on the upper supporting frame and drivingly coupled to the driving source via a power transmission mechanism. The apparatus further includes an automatic locking means for automatically locking the document placing means or at least a part of the optical unit and cancelling the locking according to an operation of moving the upper supporting frame to an open or closed position or an operation incident to this moving operation.

7 Claims, 24 Drawing Figures

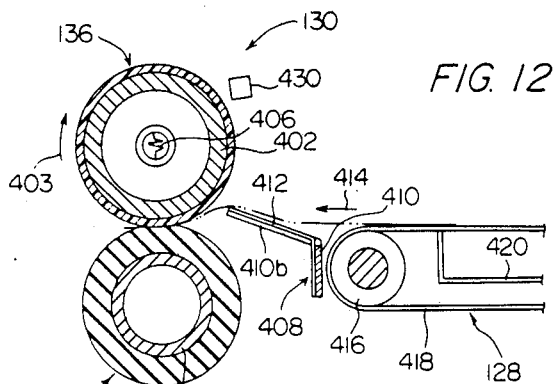
FIG. 12
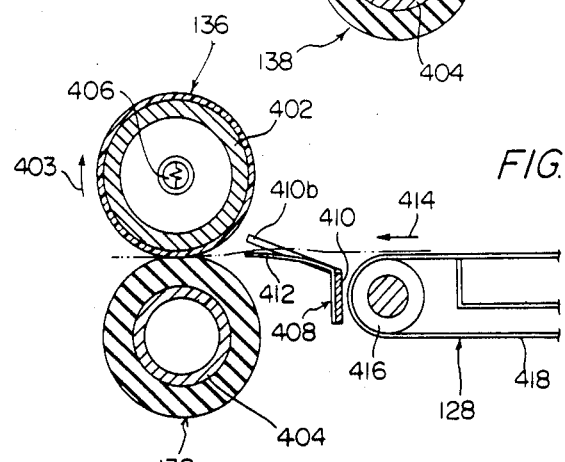
FIG. 14
FIG. 15
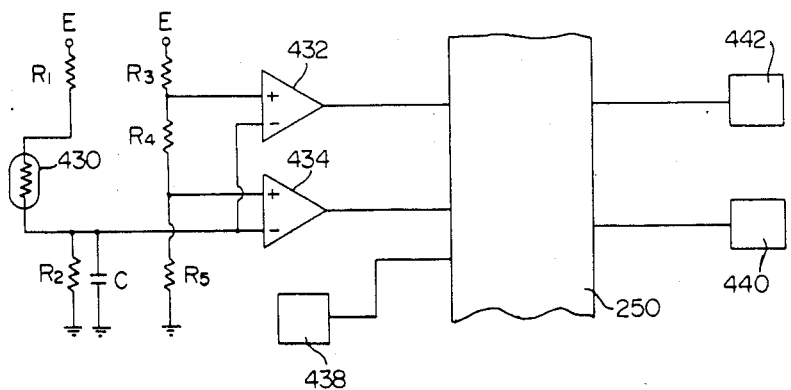

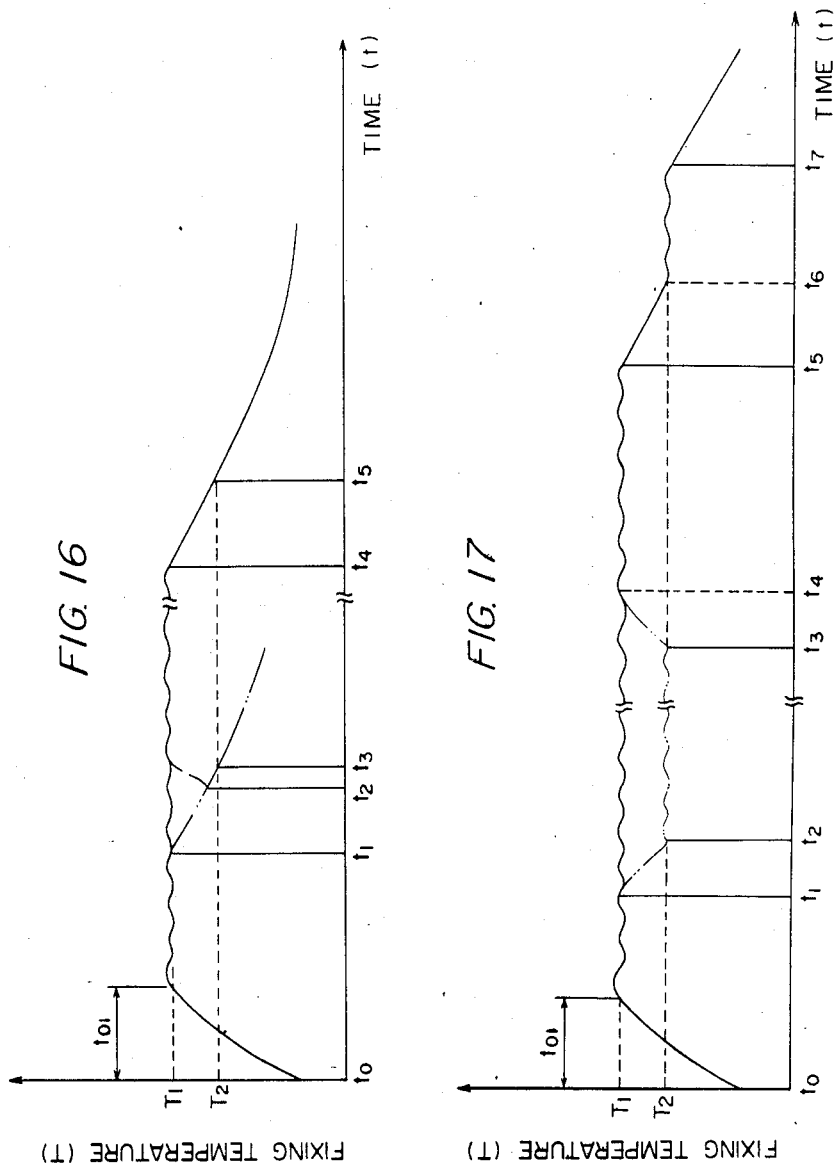

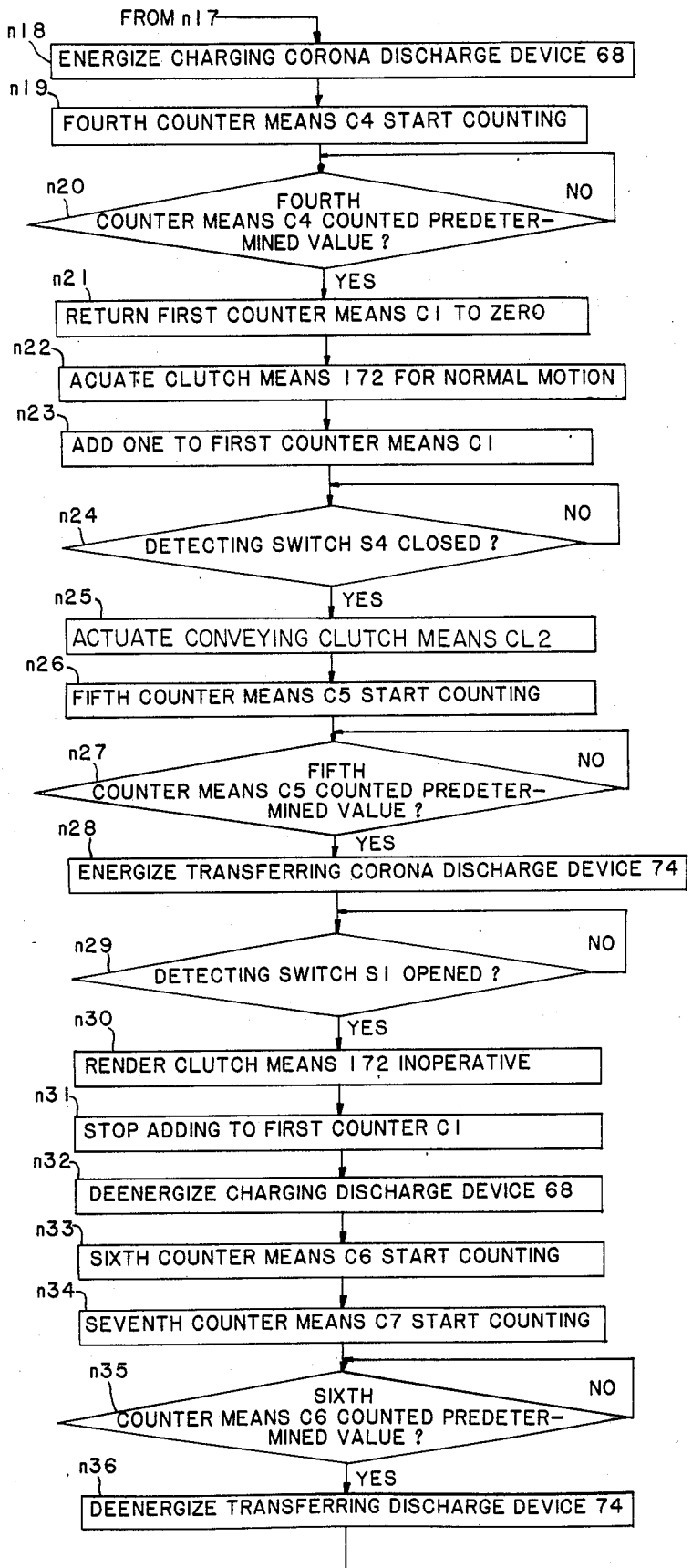
FIG. 23-A-2

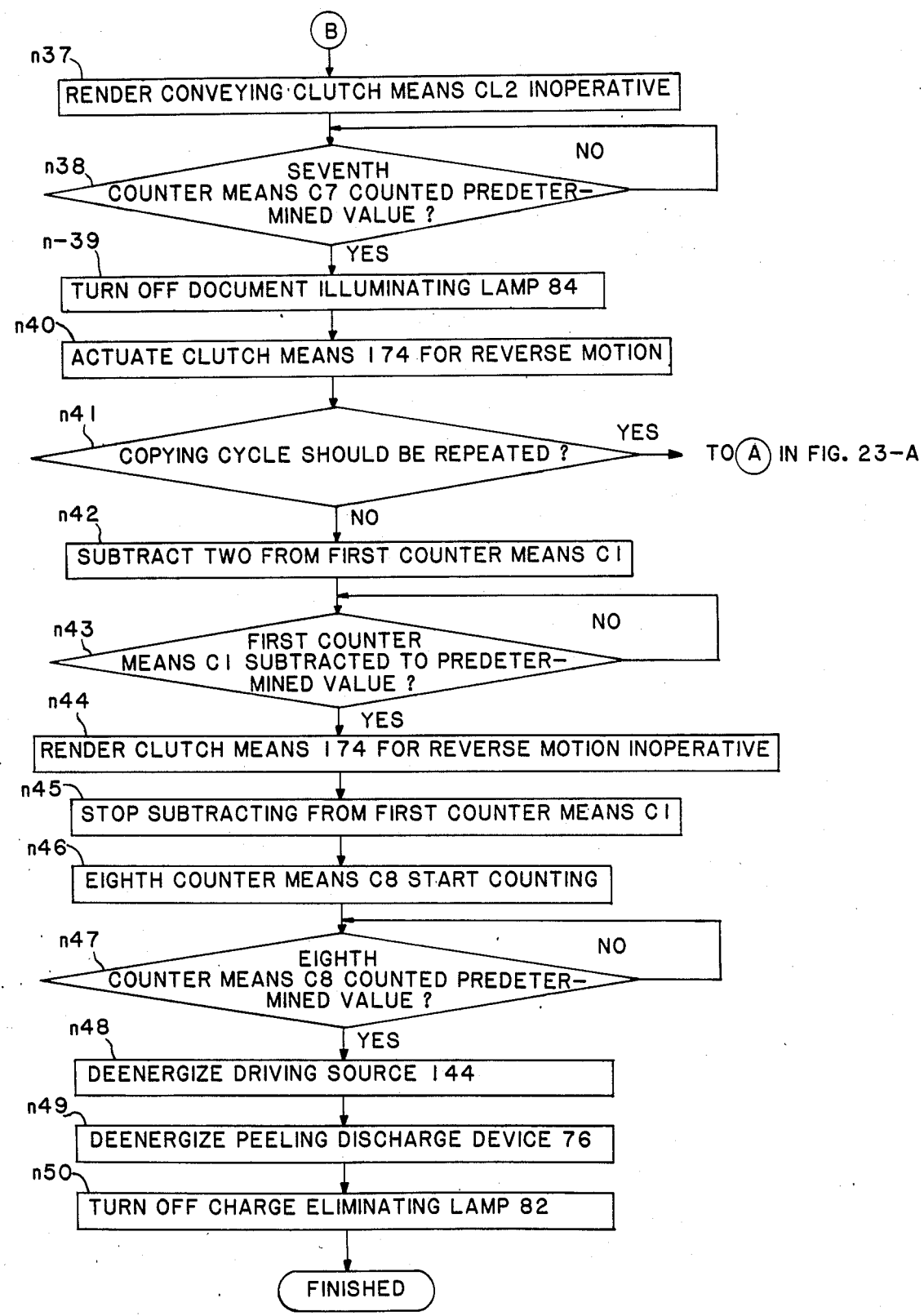
FIG. 23-B

ELECTROSTATIC COPYING APPARATUS

CROSS-REFERENCE TO RELATED APPLICATION

This application is a division of application Ser. No. 596,121, filed Apr. 3, 1984, now U.S. Pat. No. 4,636,057.

FIELD OF THE INVENTION

This invention relates to some improvements in an electrostatic copying apparatus.

DESCRIPTION OF THE PRIOR ART

Electrostatic copying apparatuses of the so-called shell type including a lower supporting frame and an upper supporting frame mounted for free pivotal movement between an open position and a closed position have been proposed and come into practical application. Generally, in such a shell-type electrostatic copying apparatus, when the upper supporting frame is held at the open position, at least a considerable portion of a conveying passage for a sheet material such as a copying paper is opened. Hence, if jamming of the sheet material should occur in the conveying passage, it can be easily taken out. However, the conventional shell-type electrostatic copying apparatuses have certain problems to be solved.

(i) For example, when the upper supporting frame is to be brought from the closed position to the open position, it is important to automatically hamper the free movement of a document placing means or at least a part of an optical unit mounted reciprocally on the upper supporting frame incident to the movement of the upper supporting frame to the open position. This requirement, however, has not been fully accurately met, or complex and expensive means are required in order to fulfil such a requirement fully accurately.

Electrostatic copying apparatuses, not limited to the shell-type, generally include a developing device for applying toner particles to a latent electrostatic image and developing it to a toner image, a fixing device for fixing the toner image on a sheet material, and in a type in which the document placing means is adapted to be moved at the time of the copying cycle, control means for moving the document placing means in the required manner. Conventional electrostatic copying apparatuses also have the following problems with regard to such devices and means.

A developing device of the type in which a so-called two-component developer composed of carrier particles and toner particles has been widely used in practice as the aforesaid developing device. Such a type of developing device has the following problems.

(ii) In order to maintain the ratio between the carrier particles and the toner particles in the developer at a certain required value by supplying the toner particles as the toner particles are consumed, it is important to control the supplying of the toner particles by detecting a characteristic of the developer corresponding to the aforesaid ratio, for example its inductance. However, depending upon the detecting position, etc., the characteristic of the developer cannot always be properly detected.

(iii) It is desired to mix the developer fully and make it sufficiently uniform also in the widthwise direction of the developing device. But this desire cannot be fully achieved.

(iv) Generally, the supplying of the toner particles is controlled by properly rotating a toner particle feed roller on the basis of the characteristic of the developer. But control means for properly rotating the toner particle feed roller is comparatively complex and expensive.

A fixing device including an upper and a lower roller cooperating with each other and an electrical heating element disposed in at least one of these rollers has been widely used as the aforesaid fixing device. This conventional fixing device has the following problems.

(v) It is desired to vary the state of feeding of a sheet material bearing a toner image to the upper and lower rollers depending upon the nature of the sheet material, for example upon whether it is relatively light and has relatively low stiffness as in an ordinary copying paper or whether it is relatively heavy and has relatively high stiffness as in an official postal card. This desire cannot be fully achieved.

(vi) In the conventional electrostatic copying apparatuses equipped with the aforesaid fixing device, various measures for saving power consumption are taken in relation to the temperature of the fixing device ascribable to the action of the electrical heating element, and the performance or non-performance of the copying cycle. But such measures have not proved to be entirely satisfactory.

(vii) As regards the control means for controlling the document placing means in the required manner, especially the one which is equipped with a microprocessor, the cost of production could still be reduced by decreasing the number of required elements of the microprocessor.

SUMMARY OF THE INVENTION

It is a first object of this invention to provide an electrostatic copying apparatus of the shell type which includes a relatively simple and inexpensive automatic locking means for accurately hampering the movement of a document placing means or at least a part of an optical unit mounted reciprocally on an upper supporting frame when the upper supporting frame is moved from its closed position to its open position.

A second object of the invention is to provide a latent electrostatic image developing device in which the characteristic of a developer can be fully properly detected without adverse effects on the developing action, etc.

A third object of this invention is to provide a latent electrostatic image developing device in which a developer is fully mixed and made uniform also in the widthwise direction of the developing device.

A fourth object of this invention is to provide a latent electrostatic image developing device which is provided with a simple and inexpensive control means for properly rotating a toner particle supplying roller.

A fifth object of this invention is to provide a fixing device in which the state of feeding of a sheet material bearing a toner image to be developed to an upper and a lower roller is varied automatically in the required manner according to the characteristic of the sheet material.

A sixth object of this invention is to provide an electrostatic copying apparatus which permits saving of power consumption based on the temperature of a fixing device and the performance or non-performance of the copying cycle.

A seventh object of this invention is to provide an electrostatic copying apparatus in which the number of required elements of a control means for controlling the movement of a document placing means in the required manner, and therefore the cost of production, can be reduced.

Other objects of this invention will become apparent from the following description.

BRIEF DESCRIPTION OF THE DRAWINGS

FIG. 12 is a sectional view showing the vicinity of a fixing device;

FIG. 14 is a sectional view showing the state in which a sheet material having relatively high stiffness is used;

FIG. 15 is a circuit diagram showing a part of a control system for the electrostatic copying apparatus of FIG. 1;

FIG. 16 is a graph showing the relation between the temperature detected by a thermistor and the time;

FIG. 17 is a graph showing the relation between the temperature detected by a thermistor and the time in a modified example;

FIGS. 23-A and 23-B are flow charts showing the mode of controlling the action of the electrostatic copying apparatus of FIG. 1.

DETAILED DESCRIPTION OF PREFERRED EMBODIMENTS

Outline of the Copying Apparatus as a Whole

The entire structure of one embodiment of the electrostatic copying apparatus which has been improved in various respects in accordance with this invention will first be described.

Figure 1:
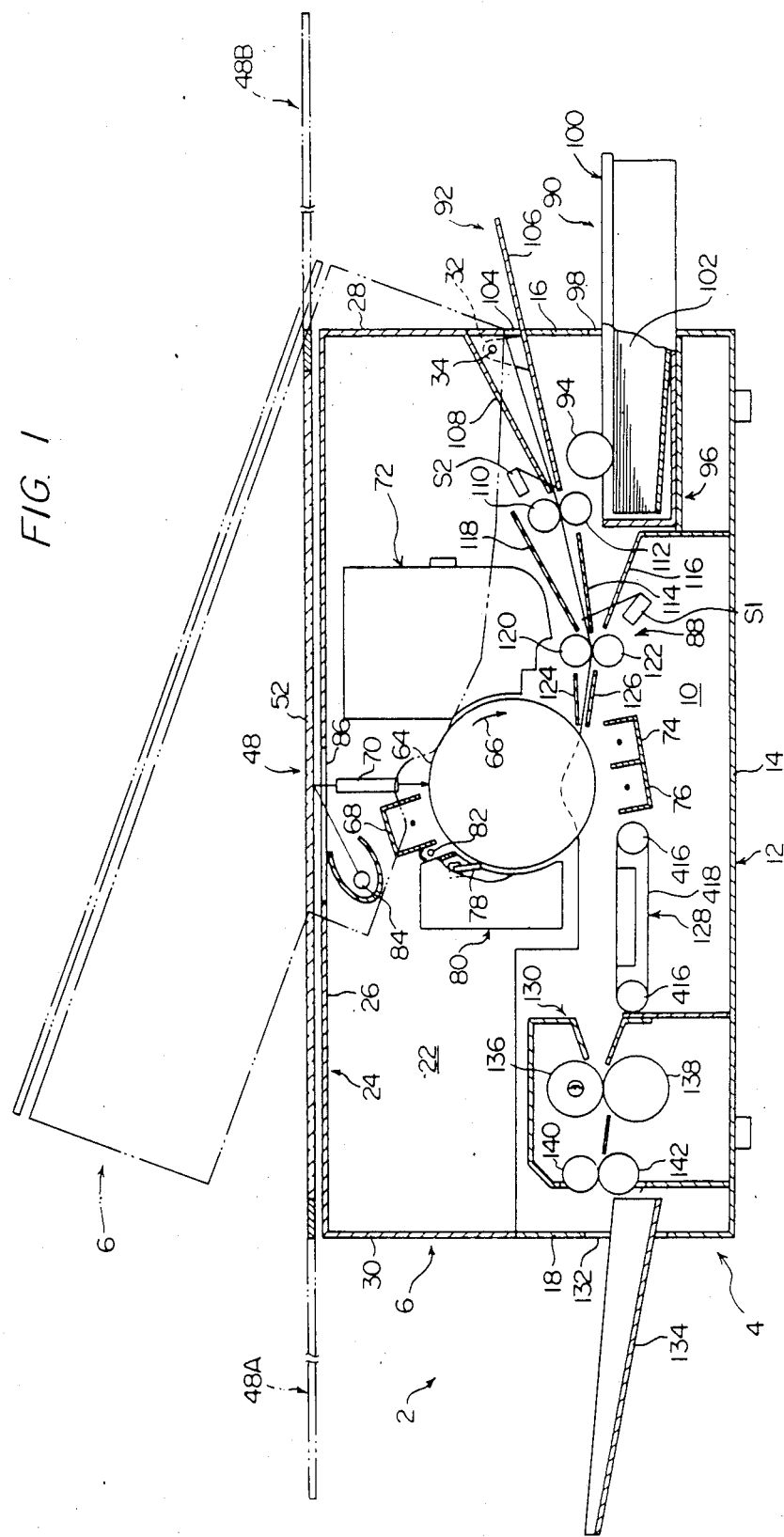
FIG. 1 is a simplified longitudinal sectional view showing one embodiment of the electrostatic copying apparatus constructed in accordance with this invention.
Figure 2:
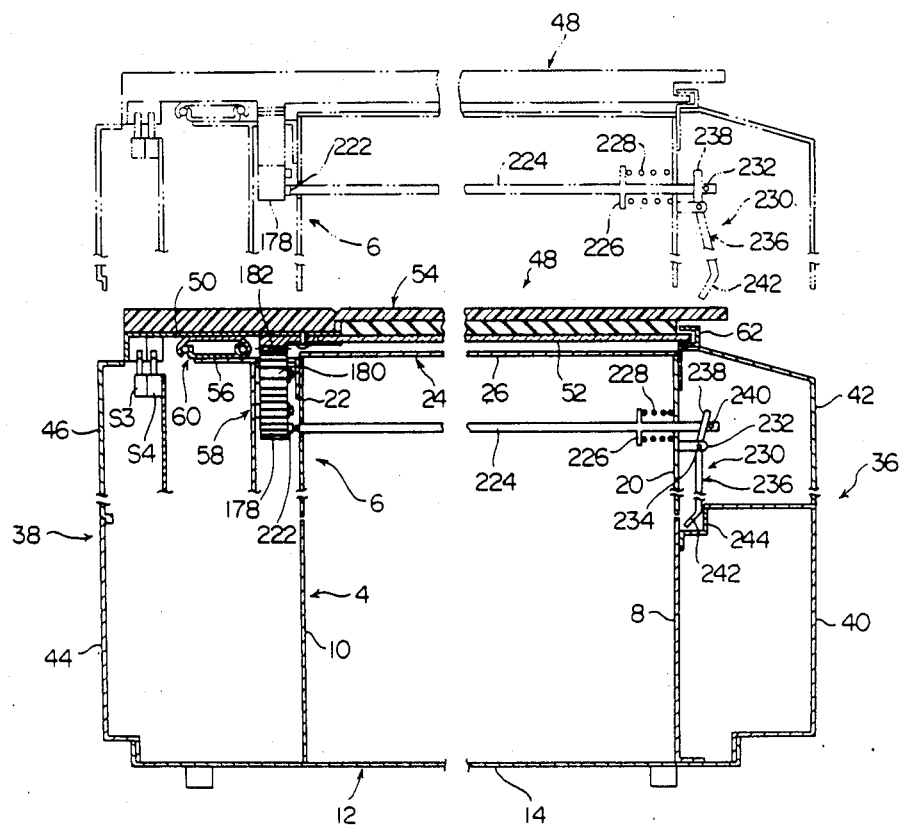
FIG. 2 is a simplified cross sectional view of the electrostatic copying apparatus of FIG. 1.

With reference to FIG. 1, the illustrated copying apparatus has a nearly rectangular parallelpipedal housing shown generally at 2. The housing 2 is defined by a lower supporting frame 4 and an upper supporting frame 6. With reference to FIG. 2 together with FIG. 1, the lower supporting frame includes a vertical front base plate 8 and a vertical rear base plate 10 disposed with a predetermined distance therebetween in the front-rear direction (a direction perpendicular to the sheet surface in FIG. 1, and the left-right direction in FIG. 2), and a bottom plate 12 fixed to the lower ends of these plates. The bottom plate 12 has a bottom wall portion 14 defining the bottom surface of the housing 2 and lower surface wall portions 16 and 18 defining the nearly lower half portions of the two side surfaces of the housing 2. On the other hand, the upper supporting frame 6 includes a vertical front base plate 20 and a vertical rear base plate 22 disposed with a predetermined distance therebetween in the front-rear direction and a top plate 24 fixed to the upper ends of these plates. The top plate 24 has a top wall portion 26 defining the top surface of the housing 2 and upper surface wall portions 28 and 30 defining the nearly upper half portions of the two side surfaces of the housing 2. The upper supporting frame 6 is mounted on the lower supporting frame 4 so that it can pivot freely between a closed position shown by solid lines in FIGS. 1 and 2 and an open position shown by two-dot chain lines in FIGS. 1 and 2. More specifically, upwardly extending supporting projections 32 are provided at the right end portions of the vertical front base plate 8 and the vertical rear base plate 10 of the lower supporting frame 4, and the vertical front base plate 20 and the vertical rear base plate 22 of the upper supporting frame 6 are pivotally mounted on these supporting projections 32 through a shaft 34. Normally, the upper supporting frame 6 is locked in the closed position shown by the solid lines in FIGS. 1 and 2 by a suitable locking mechanism (not shown), but as required, can be pivoted to the open position shown by the two-dot chain lines in FIGS. 1 and 2 with the shaft 34 as a center by cancelling the locking action of the locking mechanism.

In the illustrated copying apparatus, there are also provided a front cover 36 covering the front surface of the housing 2 and a rear cover 38 for covering the rear surface of the housing 2, as shown in FIG. 2. The front cover 36 is comprised of a lower front cover 40 fixed to the lower supporting frame 4 and an upper front cover 42 fixed to the upper supporting frame 6. Likewise, the rear cover 38 is comprised of a lower rear cover 44 fixed to the lower supporting frame 4 and an upper rear cover 46 fixed to the upper supporting frame 6. Accordingly, when the upper supporting frame 6 is moved from the closed position to the open position, approximately the upper half portions of the front cover 36 and the rear cover 38, i.e. the upper front cover 42 and the upper rear cover 46, can be moved to the open position in the same way.

A document placing means shown generally at 48 is disposed on the top surface of the housing 2 so that it can reciprocate freely in the left-right direction in FIG. 1 or a direction perpendicular to the sheet surface in FIG. 2. As clearly shown in FIG. 2, the document placing means 48 which may be in a form known per se includes a supporting base plate 50, a transparent plate 52 fixed to the supporting base plate 50, and a document cover 54 (omitted in FIG. 1) whose rear edge (left edge in FIG. 2) is pivotably mounted on the supporting base plate 50 by a suitably mechanism (not shown). With reference to FIG. 2, the method of mounting the document placing means 48 will be described. A supporting member 58 having a horizontal portion 56 is fixed to the rear surface of the vertical rear base plate 22 of the upper supporting frame 6, and between the horizontal portion 56 of the supporting member 58 and the supporting base plate 50 of the document placing means 48 is interposed a sliding mechanism 60 (which may conveniently be one commercially available under the tradename "Aculide") extending in the reciprocating direction of the document placing means 48. On the other hand, a guide member 62 having a rearwardly opened guide groove at its upper portion extending upwardly beyond the top surface of the housing 2 is fixed to the front surface of the vertical front base plate 20 of the upper supporting frame 6. The front edge portion of the transparent plate 52 of the document placing means 48 is slidably received in the guide groove of the guide member 62. Thus, the document placing means 48 is mounted such that it can freely reciprocate between a start-of-scan position shown by a two-dot chain line 48A in FIG. 1 and a scan movement limit position shown by a two-dot chain line 48B in FIG. 1.

With reference to FIG. 1, a rotating drum 64 having a photosensitive member on its peripheral surface is rotatably mounted nearly centrally within the housing 2. Around the rotating drum 64 adapted to be rotated in the direction of an arrow 66 are disposed a charging corona discharge device 68, an optical unit 70, a latent electrostatic image developing device 72, a transferring corona discharge device 74, a peeling corona discharge device 76, a cleaning device 80 having a cleaning blade 78 and a charge eliminating lamp 82 in this sequence in the rotating direction of the drum 64. In relation to the optical unit 70, a document illuminating lamp 84 is also provided. The document illuminating lamp 84 illuminates a document (not shown) to be copied, placed on the transparent plate 52 of the document placing means 48, through an opening 86 formed at the top wall portion 26 of the top plate 24. The optical unit 70 is constructed by arranging many elongate optical elements extending in the vertical direction (for example, rod-like lenses sold under the tradename "Selfox Microlense" by Nippon Sheet Glass Co., Ltd.), and as shown by an arrow in FIG. 1, projects the reflected light from the document onto the peripheral surface of the rotating drum 64.

A sheet material conveying device shown generally at 88 is disposed in the nearly lower half portion of the housing 2. At one end (the right end in FIG. 1) of the sheet material conveying device 88 are provided a cassette-type copying paper feed device 90 and a manual sheet feed device 92. The copying paper feed device 90 consists of a combination of a paper cassette receiving section 96 having a feed roller 94 provided therein and a paper cassette 100 to be loaded in the paper cassette receiving section 96 through an opening 98 formed on the right side surface of the housing 2 (more specifically the right side lower surface wall portion 16 of the bottom plate 12), and feeds copying paper sheets one by one from a copying sheet layer 102 accommodated in the cassette 100 by the action of the feed roller 94. The manual feed device 92 includes a guide plate 106 protruding outwardly through an opening 104 formed in the right side surface of the housing 2, a guide plate 108 located above the guide plate 106, and a pair of feed rollers 110 and 112 located downstream of (on the left in FIG. 1) the guide plates 106 and 108. When a suitable sheet material such as a sheet-like copying paper is positioned on the guide plate 106 and advanced to the nipping position of the feed rollers 110 and 112, these feed rollers 110 and 112 nips the sheet material and feeds it. The copying paper fed from the copying paper feed device 90 between the guide plates 114 and 116 or the sheet material fed from the manual feed device 92 between the guide plates 114 and 118 is passed between guide plates 124 and 126 by the action of a pair of conveying rollers 120 and 122 and conveyed to a position between the rotating drum 64 and the transferring corona discharge device 74 and the peeling corona discharge device 76. Then, by the action of a suitable conveying belt mechanism 128, it is sent to a fixing device 130. Thereafter, it is discharged into a receiving tray 134 through an opening 132 formed in the left side surface of the housing 2 (more specifically, the left side lower surface wall portion 18 of the bottom plate 12). The fixing device 130 includes a fixing roll pair comprised of an upper roller 136 and a lower roller 138 cooperating with each other (the structure of the fixing device 130 will be described in detail hereinafter). The sheet material from the fixing roller is discharged into the receiving tray 134 by the action of a pair of discharge rollers 140 and 142.

Thus, it will be easily understood with reference to FIG. 1 that the guide plate 108, the feed roller 110, the guide plate 118, the conveying roller 120 and the guide plate 124 in the sheet material conveying device 88 are mounted on the upper supporting member 6 together with the rotating drum 64, the charging corona discharge device 68, the optical unit 70, the developing device 72, the cleaning means 80, the charge eliminating lamp 82 and the document illuminating lamp 84. On the other hand, the copying paper feed device 90, the guide plate 106, the feed roller 112, the guide plate 114, the guide plate 116, the conveying roller 122, the guide plate 126, the transferring corona discharge device 74, the peeling corona discharge device 76, the conveying belt mechanism 128, the fixing device 130 and the receiving tray 134 are mounted on the lower supporting frame 4. Accordingly, when the upper supporting frame 6 is moved from the closed position shown by the solid line to the open position shown by the two-dot chain line, most of the conveying passage for the sheet material is opened, and therefore in the event of jamming, the sheet material can be easily taken out from it.

In the copying apparatus described above, the charging corona discharge device 68 charges the photosensitive member to a specified polarity substantially uniformly while the rotating drum is rotated in the direction of arrow 66. Then, the image of the document is projected onto the photosensitive member through the optical unit 70 (at this time, the document placing means 48 makes a scanning exposure movement to the right in FIG. 1 from the start-of-scan position shown by the two-dot chain line 48A in FIG. 1) to form on the photosensitive member a latent electrostatic image corresponding to the document. Thereafter, the developing device 72 applies toner particles to the latent electrostatic image on the photosensitive member to develop it to a toner image. Subsequently, a sheet material such as copying paper fed from the copying paper feed device 90 or the manual sheet feed device 92 is brought into contact with the photosensitive member, and by the action of the transferring corona discharge device 74, the toner image on the photosensitve member is transferred to the sheet material. The sheet material is then peeled off from the photosensitive member by the action of the peeling corona discharge device 76. The sheet material having the toner image transferred thereto is then conveyed to the fixing device 130 where the toner image is fixed. The sheet material having the fixed toner image is then discharged into the receiving tray 134. In the meantime, the rotating drum 64 continues to rotate. The residual toner particles are removed from the photosensitive member by the action of the cleaning device 80, and the residual charge on the photosensitive member is erased by the action of the charge eliminating lamp 82.

Driving System

Figure 3:
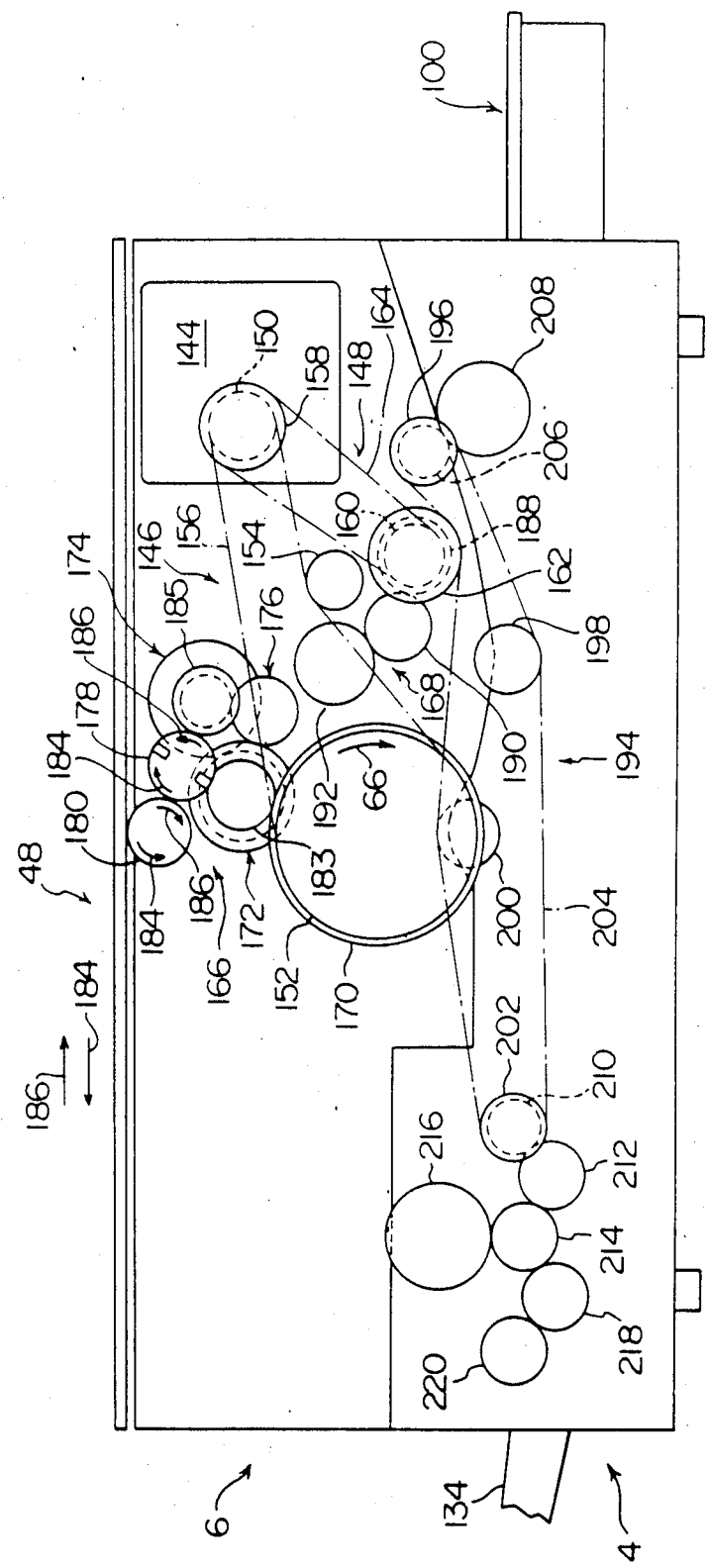
FIG. 3 is a simplified view showing a driving system of the electostatic copying apparatus of FIG. 1.

With reference to FIG. 3 in conjunction with FIG. 1, the driving system in the illustrated copying apparatus will be described in summary.

In the illustrated copying apparatus, a driving source 144 which may be an electric motor is provided in the upper supporting frame 6. In relation to the driving source 144, a power transmission mechanism 146 for the rotating drum and an interlocking power transmission mechanism 148 are provided in the upper supporting frame 6. The power transmission mechanism 146 for the rotating drum includes a toothed pulley 150 fixed to the output shaft of the driving source 144, a toothed pulley 152 linked to the rotating drum 64, a rotatably mounted tensioning toothed pulley 154, and a timing belt 156 wrapped about these toothed pulleys 150, 152 and 154. The interlocking power transmission mechanism 148 includes a sprocket wheel 158 fixed to the output shaft of the driving source 144, a rotatably mounted sprocket wheel 160, a sprocket wheel 162 mounted coaxially, and rotatably as a unit, with the sprocket wheel 160, and a chain 164 wrapped about the sprocket wheels 158 and 160.

Figure 4:
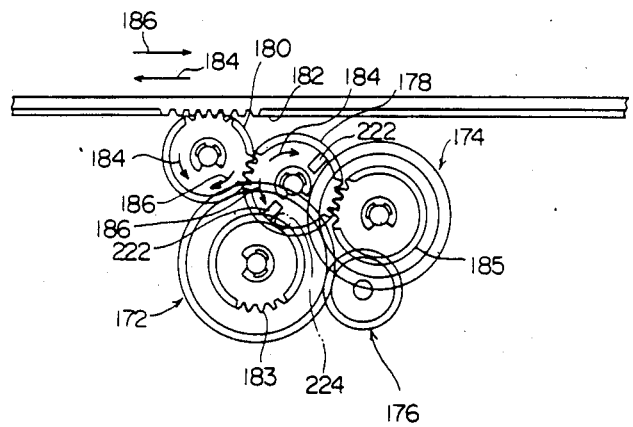
FIG. 4 is a simplified view showing a part of the driving system of FIG. 3.

The upper supporting frame 6 further has provided therein a power transmission mechanism 166 for the document placing means and a power transmission mechanism 168 for the developing device. The power transmission mechanism 166 for the document placing means includes a gear 170 mounted coaxially with, and rotatably as a unit with, the toothed pulley 152 in the power transmission mechanism 146 for the rotating drum, a double clutch means 176 comprising a clutch means 172 for normal motion and a clutch means 174 for reverse motion, a gear 178, a pinion gear 180, and a rack 182 (FIGS. 2 and 4) fixed to the lower surface of the supporting base plate 50 of the document placing means 48. With reference to FIGS. 3 and 4 in conjunction with FIG. 1, the clutch means 172 for normal motion has an input gear 183 in mesh with the gear 170, and the clutch means 174 for reverse motion has an output gear 185 in mesh with the gear 178. The double clutch means 176 comprised of the clutch means 172 and 174 may be substantially the same as the double electromagnetically controlled spring clutch mechanism disclosed in the specification and drawings of co-pending Japanese Patent Application No. 47120/1983 entitled "Electromagnetically Controlled Spring Clutch Mechanism" filed Mar. 23, 1983. Accordingly, the specification and drawings of the above application are cited as reference instead of giving a detailed description of the structure of the double clutch means 176.

The gear 178 is engaged with the pinion gear 180, and the pinion gear 180 is engaged with the rack 182 extending in the reciprocating direction (the left-right direction in FIGS. 1, 3 and 4) of the document placing means 48. When the driving source 144 is energized and the gear 170 is rotating in the direction of arrow 66, actuation of the clutch means 172 for normal motion causes the gear 178 and the pinion gear 180 to rotate in the direction shown by an arrow 184, and consequently the document placing means 48 is moved at a predetermined speed V in the direction of arrow 184. On the other hand, when the clutch means 174 for reverse motion is actuated at this time, the gear 178 and the pinion gear 180 are rotated in the direction of an arrow 186, and consequently, the document placing means 48 is moved at a speed double the speed V, i.e. 2 V, in the direction of arrow 186.

The power transmission mechanism 168 for the developing device 168 includes a gear 188 rotated coaxially with, and rotatably as a unit with, the sprocket wheels 160 and 162 in the interlocking power transmission mechanism 148, a gear 190 engaged with the gear 188 and a gear 192 engaged with the gear 190. The gear 190 is connected to a sleeve member (to be described hereinafter) provided in the developing device 72.

A power transmission mechanism 194 which has to do with the conveying of a sheet material is mounted on the lower supporting frame 4. The power transmission mechanism 194 includes sprocket wheels 196, 198, 200 and 202 and a chain 204 wrapped about these sprocket wheels 196, 198, 200 and 202. The sprocket wheel 196 is connected to the feed roller 112 (FIG. 1). The sprocket wheel 196 also has provided therein a gear 206 coaxially, and rotatably as a unit, with the sprocket wheel 196. A gear 208 is engaged with the gear 206, and the gear 208 is connected to the feed roller 94 (FIG. 1) in the paper feed device 90 through a suitable clutch means (not shown) electromagnetically controlled. The sprocket wheel 198 is connected to the conveying roller 122 through a suitable electromagnetically controlled clutch means (not shown). The sprocket wheel 200 is provided so as to keep the chain 204 taut. The sprocket wheel 202 is connected to a driven roller 416 (FIG. 1) in the conveying belt mechanism 128. The sprocket wheel 202 has attached thereto a gear 210 coaxial, and rotatably as a unit, with it. A gear 212 is in mesh with the gear 210, and a gear 214 is in mesh with the gear 212. A gear 216 and a gear 218 are kept in mesh with the gear 214, and a gear 220, with the gear 218. The gear 216 is linked to the upper roller 136 (FIG. 1) of the fixing device 130, and the gear 220, to a discharge roller 142.

It will be readily understood from FIGS. 1 and 3 that when the upper supporting frame 6 is held at the closed position, the sprocket wheel 162 of the interlocking power transmission mechanism 148 provided in the upper supporting frame 6 is engaged with the chain 204 of the power transmission mechanism 194 provided in the lower supporting frame 4 and consequently, the driving source 144 is drivingly connected to the power transmission mechanism 194 through the interlocking power transmission mechanism 148. On the other hand, when the upper supporting frame 6 is moved to the open position shown by the two-dot chain line in FIG. 1, the sprocket wheel 162 of the interlocking power transmission mechanism 148 is brought out of engagement with the chain 204 of the power transmission mechanism 194.

Automatic Locking Means

As stated hereinabove, the illustrated copying apparatus includes the lower supporting frame 4 and the upper supporting frame 6 mounted thereon for free pivotal movement between the open position and the closed position, and the document placing means 48 is reciprocally mounted on the upper supporting frame 6. When the upper supporting frame 6 is held at the closed position shown by the solid line in FIG. 1, the document placing means 48 is positioned substantially horizontally. But when the upper supporting frame 6 is moved from the closed position to the open position shown by the two-dot chain line in FIG. 1, the document placing means 48 is tilted according to the movement of the upper supporting frame 6, and tends to move downwardly to the right in FIG. 1 owing to its own weight, as can be easily seen from FIG. 1. When the upper supporting frame 6 is moved to the open position for disposing of a sheet material jammed in the sheet material conveying passage or otherwise, the driving source 144 is generally deenergized simultaneously with, or before the starting of the opening movement of the upper supporting frame 6 (for example when the jamming of the sheet material is detected by a suitable means). Accordingly, the driving source 144 and the power transmission mechanisms drivingly connecting it to the document placing means 48 (i.e., the power transmission mechanism 146 for the rotating drum and the power transmission mechanism 166 for the document placing means 48) have no sufficient resisting force to hamper the aforesaid movement of the document placing means 48. Hence, unless some means for checking the movement of the docmuent placing means 48 is provided, the document placing means 48 moves freely downwardly to the right in FIG. 1, and may collide with an object located around the copying apparatus, for example, resulting in a damage to itself and/or the object.

Accordingly, in the illustrated copying apparatus improved in accordance with this invention, a relatively simple and inexpensive automatic locking means is provided in order to hamper the free movement of the document placing means 48 accurately during the opening movement of the upper supporting frame 6.

With reference to FIGS. 2 and 4, two projections 222 located at diametrically opposite positions are formed in the front surface of the gear 178 of the power transmission mechanism 166 for the document placing means in the illustrated embodiment. A locking member 224 is disposed in relation to the projections 222. The locking member 224 formed of a slender rod is mounted on the vertical front base plate 20 and the vertical rear base plate 22 of the upper supporting frame 6 for free movement in the front-rear direction (the left-right direction in FIG. 2). An annular flange 226 located slightly rearwardly (to the left in FIG. 2) of the vertical front base plate 20 is formed in the locking member 224. A spring means 228 composed of a compression coil spring is disposed between the annular flange 226 and the vertical front base plate 20. The spring means 228 elastically biases the locking means 224 rearwardly (to the left in FIG. 2). The front end portion of the locking member 224 projects forwardly beyond the vertical front base plate 20, and a lock cancelling mechanism 230 is provided in relation to this front end portion. The lock cancelling mechanism 230 includes a pivot member 236 pivotally mounted by a pin 234 on a supporting piece 232 fixed to the front surface of the vertical front base plate 20. One end portion, i.e. the upper end portion 238, of this pivot member 236 is of a bifurcated shape striding over the front end portion of the locking member 224. To the locking member 224 is fixed a pin 240 which extends in front of the bifurcated upper end portion 238 of the pivot member 236 in a direction perpendicular to the sheet surface in FIG. 2, and cooperates with the bifurcated upper end portion 238 of the pivot member 236. On the other hand, the other end portion, i.e., the lower end portion 242, of the pivot member 236 is slightly inclined downwardly and rearwardly (to the left in FIG. 2). In relation to this lower end portion 242 of the pivot member 236, an engaging piece 244 of an L-shaped cross section is secured to the front surface of the vertical front base plate 8 of the lower supporting frame 4.

The operation of the automatic locking means described above will be described. When the upper supporting member 6 is held at the closed position shown by the solid line in FIG. 2, the engaging piece 244 acts on the lower end portion 242 of the pivot member 236 to hamper the counterclockwise pivoting of the pivot member 236 in FIG. 2, and thus restrains the pivot member 236 at an operating position shown by a solid line in FIG. 2. When the pivot member 236 is restrained at the operating position, the bifurcated upper end portion 238 of the pivot member 236 acts on the pin 240 fixed to the locking member 224, and urges the locking member 224 to a lock cancelling position shown by a solid line in FIG. 2 against the elastic biasing action of the spring means 228. When the locking member 224 is forcibly held at the lock cancelling position, the rear end of the locking member 224 is located slightly forwardly of the front end of the projections 222 formed in the front surface of the gear 178, and therefore, the rear end of the locking member 224 does not hamper rotation of the gear 178 by interfering with the projections 222.

On the other hand, when the upper supporting frame 6 is somewhat moved toward the open position shown by the two-dot chain line in FIG. 2 from the closed position shown by the solid line in FIG. 2, the lower end portion 242 of the pivot member 236 comes out of engagement with the engaging piece 244, thus permitting the counterclockwise pivoting of the pivot member 236 in FIG. 2. As a result, the locking member 224 is moved rearwardly (to the left in FIG. 2) by the elastic biasing action of the spring means 228, and held at a locking position at which its rear end abuts against the front surface of the gear 178. Simultaneously, the pin 240 fixed to the locking member 224 acts on the bifurcated upper end portion 238 of the pivot member 236, and the pivot member 236 is held at a non-operating position shown by a two-dot chain line in FIG. 2.

As will be readily understood from FIG. 4, the rear end of the locking member 224 which has abutted against the front surface of the gear 178 is located within the rotating trajectory of the projections 222 formed in the front surface of the gear 178 and interferes with the rotation of the projections 222. Hence, at whatever angular position the gear 178 exists, either one of the two projections 222 abuts against the rear end of the locking member 224 before the gear 178 rotates through an angle of 180° and the rotation of the gear 178 is thus hampered. Let us suppose that at the beginning of the opening movement of the upper supporting frame 6 from the closed position toward the open position, the rear end of the locking member 224 is located in alignment with either one of the two projections 222. At this time, even when the locking member 224 is moved rearwardly by the elastic biasing action of the spring means 228, the rear end of the locking member 224 abuts against the front surface of either one of the two projections 222 whereby the locking member 224 is not moved to the aforesaid locking position. When at this time the gear 178 is rotated slightly (and the document placing means 48 is slightly moved), the alignment of either one of the projections 222 with the locking member 224 is cancelled, and therefore, the locking member 224 is moved to the locking position by the elastic biasing action of the spring means 228, thereby checking the rotation of the gear 178. Since as stated above the gear 178 is connected via the pinion gear 180 to the rack 182 fixed to the under surface of the document placing means 48, checking of the rotation of the gear 178 causes the document placing means 48 to stop moving. It will be evident therefore that when the upper supporting frame 6 starts its opening movement from the closed position toward the open position, the automatic locking means automatically acts irrespective of the position of the document placing means 48 at this time, thereby hampering the movement of the document placing means 48 and permiting its movement corresponding only to approximately the half rotation of the gear 178 at the largest. In the illustrated embodiment, two projections 222 are formed in the front surface of the gear 178. But it is possible to form only one projection, or three or more circumferentially spaced projections. It will be readily understood that when only one projection is formed, the maximum amount of movement of the document placing means 48 which can occur after the upper supporting frame 6 started movement from the closed position to the open position is increased to an amount corresponding to about one rotation of the gear 178, and that when three or more projections are formed, the maximum amount of movement of the document placing means 48 which can occur after the opening movement of the upper supporting frame 6 from the closed position toward the open position is decreased according to an increase in the number of projections.

When the upper supporting frame 6 is moved to near the closed position in its closing movement from the open position shown by the two-dot chain line in FIG. 2 toward the closed position shown by the solid line in FIG. 2, the tilted lower end portion 242 of the pivot member 236 abuts against the upper end of the engaging piece 244. Thereafter, the pivot member 236 undergoes the action of the engaging piece 244 according to the closing movement of the upper supporting frame 6 and is pivoted clockwise in FIG. 2. When the upper supporting frame 6 reaches the closed position, the pivot member 236 is restrained at the operating position shown by a solid line in FIG. 2 by the engaging piece 244. In this manner, while the pivot member 236 is pivoted from the non-operating position shown by the two-dot chain line in FIG. 2 to the operating position shown by the solid line in FIG. 2, the bifurcated upper end portion of the pivot member 236 acts on the pin 240 fixed to the locking member 224 to move the locking member 224 from the locking position shown by the two-dot chain line in FIG. 2 to the lock cancelling position shown by the solid line in FIG. 2. Consequently, when the upper supporting frame 6 is brought to the closed position, hampering of the rotation of the gear 178 and therefore hampering of the movement of the document placing means 48 are automatically cancelled.

In the above specific embodiment, the projections 222 are formed in the front surface of the gear 178. If desired, grooves may be formed instead of the projections 222 so that when the locking member 224 is held at the locking position, its rear end advances into the grooves. Alternatively, it is possible to form projections or grooves in the pinion gear 180, for example, instead of the gear 178, and provide the locking member 224 in relation of such projections or grooves. If further desired, it is possible to form a plurality of projections or grooves at suitable intervals in the reciprocating direction of the document placing means 48 on the side surface of the rack 182 fixed to the under surface of the document placing means 48 or at suitable positions of the document placing means 48, and to provide the locking member 224 in relation to such projections or grooves.

Figure 5:
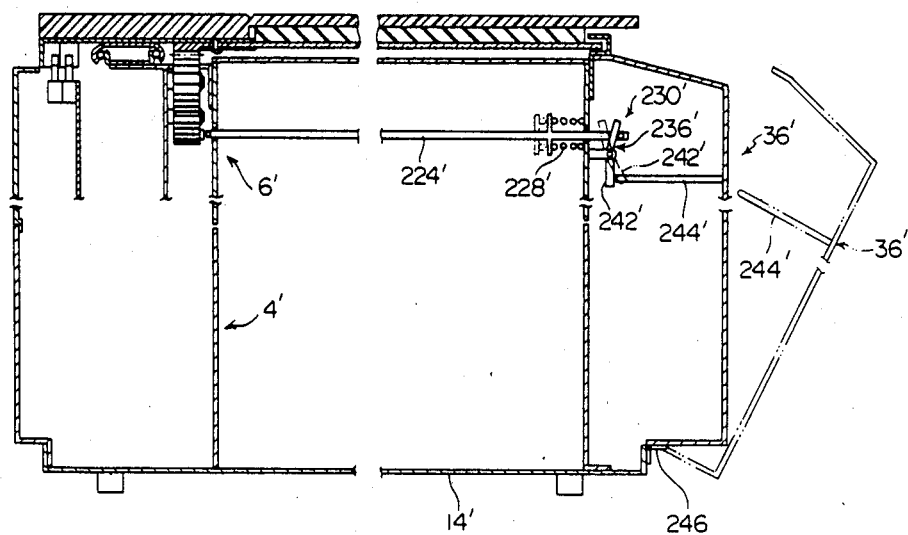
FIG. 5 is a simplified cross sectional view, similar to FIG. 2, showing a modified example of an automatic locking means for a document placing means.

FIG. 5 shows a modified example of the automatic locking means. In this modified example, the front cover 36' is formed integrally ranging from its lower end to its upper end. The front cover 36' is mounted on the lower supporting frame 4' for free pivoting movement between a closed position shown by a solid line and an open position shown by a two-dot chain line by linking its lower end portion to the front edge portion of the bottom plate 14' of the lower supporting member 4' through a hinge means 246. It will be readily understood that in the modified example, the front cover 36' needs to be moved from the closed position to the open position prior to moving the upper supporting frame 6' from the closed position to the open position, and the front cover 36' needs to be moved from the open position to the closed position after the upper supporting frame 6' has been moved from the open position to the closed position. In this embodiment, the restraining of the lock cancelling mechanism 230 may be cancelled by moving the front cover 36' from the closed position toward the open position instead of cancelling it by moving the upper supporting frame 6' from the open position toward the closed position.

In the modified example illustrated in FIG. 5, an engaging piece 244' extending rearwardly (to the left in FIG. 5) is fixed to the rear surface of the front cover 36'. When the front cover 36' is held at the closed position, the engaging piece 244' acts on the lower end portion 242' of the pivot member 236' to restrain the pivot member 236' at the operating position shown by a solid line, and thus, the locking member 224' is maintained at the lock cancelling position against the elastic biasing action of the spring means 228'. When the front cover 36' starts to move from the closed position toward the open position, the engaging piece 244' comes out of engagement with the lower end portion 242' of the pivot member 236', and therefore, the restraining of the pivot member 236' is cancelled. As a result, the locking member 224' is moved to the locking position by the elastic biasing action of the spring means 228', and at the same time, the pivot member 236' is pivoted to the non-operating position shown by the two-dot chain line.

Otherwise, the structure of the modified embodiment shown in FIG. 5 is substantially the same as the embodiment described hereinabove.

In the modified embodiment shown in FIG. 5, the lock cancelling mechanism 230' is operated according to the opening and closing movement of the front cover 36'. When the copying apparatus includes another member which is moved to an open position prior to the opening movement of the upper supporting frame 6' and to a closed position after closing movement of the upper supporting frame 6', the lock cancelling mechanism 230' can be adapted to be operated according to the opening and closing movement of the other member.

When the power transmission mechanism 166 for the document placing means interposed between the document placing means 48 and the driving source 144 includes the clutch means 172 for normal motion and the clutch means 174 for reverse motion as in the illustrated copying apparatus, the movement of the document placing means 48 may also be hampered by detecting the starting of the opening movement of the upper supporting frame 6 from the closed position toward the open position (or the starting of the opening movement of the front cover 36' from the closed position toward the open position), and simultaneously operating the clutch means 172 and 174.

Figure 6:
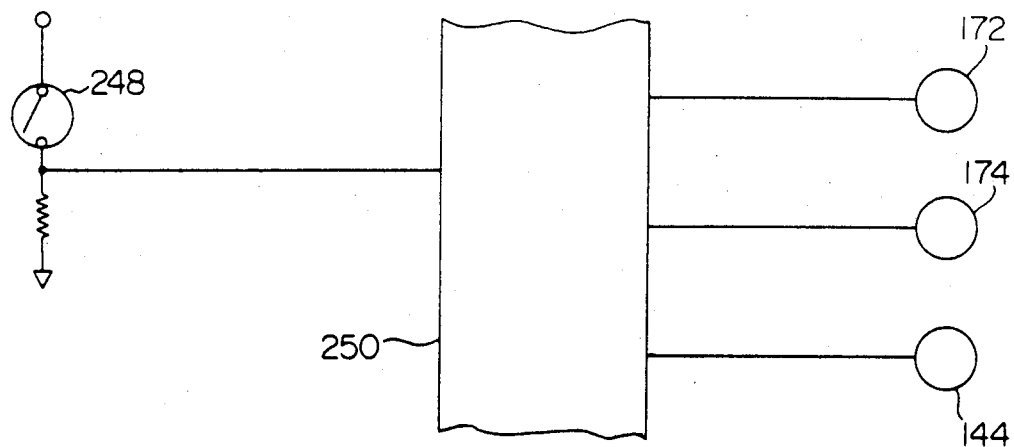
FIG. 6 is a block diagram showing another modified example of the automatic locking means for the document placing means.

With reference to FIG. 6, a detecting means 248 which may be constructed of a limit switch, a reed switch, or the like is off when the upper supporting frame 6 (or the front cover 36') is at the closed position, but when the upper supporting frame 6 (or the front cover 36') is moved slightly from the closed position toward the open position, it is turned on to generate a signal. The signal is fed to a control means 250 which may be a microprocessor provided in a copying apparatus for various controlling purposes. Upon receipt of the above signal, the control means 250 simultaneously actuates the clutch means 172 for normal motion and the clutch means 174 for reverse motion. As a result, by the mutual action of the clutch means 172 and 174, the movement of the power transmission mechanism 166 for the document placing means is hampered accurately, and therefore, the movement of the document placing means 48 is hampered accurately.

In order for the automatic locking means to act effectively, the power supply switch for coupling a commercial power supply, etc. to the copying apparatus needs to be closed. Or a battery at least for the detecting means 248, the control means 250, the clutch means 172 for normal motion and the clutch means 174 for reverse motion should be built in the copying apparatus. In addition, it is important that the control means 250 should deenergize the driving source 144 simultaneously with, or before, the simultaneous actuation of the clutches 172 and 174. Otherwise, the driving force transmitted from the driving source 144 would damage the clutch means 172 and 174, or the driving source 144 would be injured. In view of this, it is preferred that when the detecting means 248 is closed to produce the aforesaid signal, the control means 250 should deenergize the driving source 144 if the driving source 144 has been energized up to that time, and that simultaneously with it, or after some delay of time, it should simultaneously actuate both the clutch means 172 and 174.

Some specific embodiments of the automatic locking means have been described hereinabove with reference to the hampering of the movement of the document placing means. The automatic locking means described above can also be applied to the automatic hampering of a part or the whole of the optical system in a copying apparatus of the type in which a part or the whole of the optical unit is mounted reciprocably on the upper supporting frame (and therefore, in scanning and exposing a document, not the document placing means but the whole or part of the optical unit is moved ) instead of mounting the document placing means reciprocably on the upper supporting frame.

Latent Electrostatic Image Developing Device

Now, a detailed description will be made of the structure of the developing device 72 for applying toner particles to a latent electrostatic image formed on the photosensitive member on the peripheral surface of the rotating drum 64 to develop it to a toner image.

Figure 7:
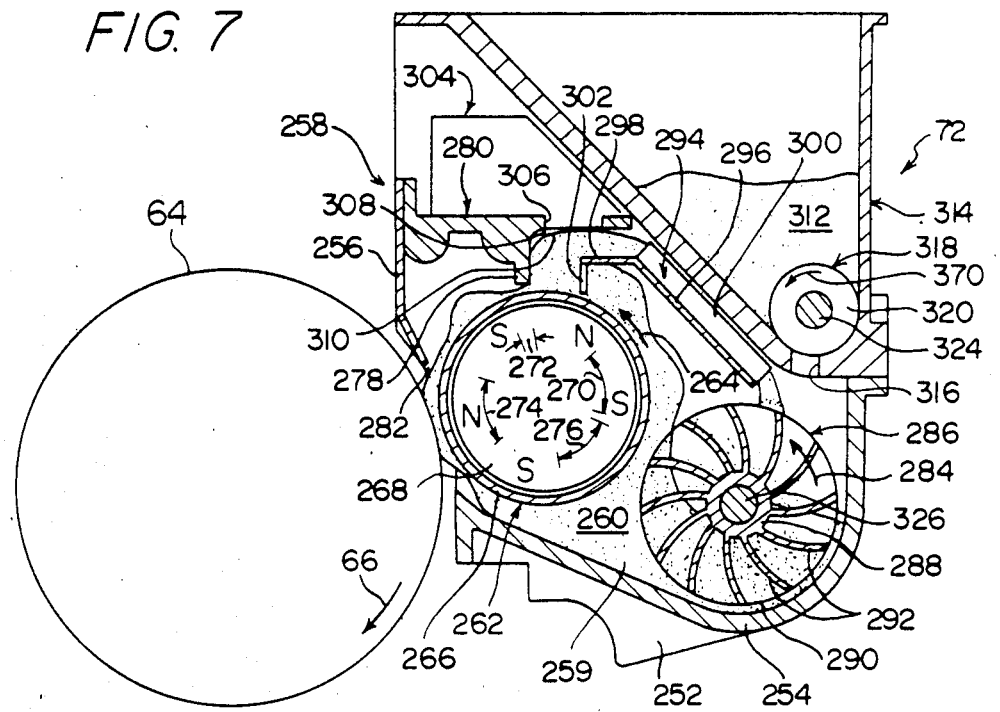
FIG. 7 is a sectional view showing a developing device in the electrostatic copying apparatus of FIG. 1.

With reference to FIG. 7, the illustrated developing device 72 includes a development housing 258 defined by a front and a rear wall 252 (only the rear wall is shown in FIG. 7) spaced from each other in the front-rear direction (a direction perpendicular to the sheet surface in FIG. 7), a recessed bottom wall 254 and a side wall 256. The lower portion of the development housing 258 defines a developer receptacle 259 for accommodating a two-component developer 260 composed of carrier particles and toner particles.

A developer applicator means 262 is disposed within the development housing 258. The developer applicator means 262 in the illustrated embodiment is comprised of a cylindrical sleeve member 266 adapted to be rotated in the direction of an arrow 264 and a stationary permanent magnet 268 disposed within the sleeve member 266. The stationary permanent magnet 268 is in roll form, and has a plurality of magnetic poles circumferentially spaced from each other at its peripheral edge portion (three S poles and two N poles therebetween).

Around the sleeve member 266 of the developer applicator means 262, a developer drawing zone 270, a brush length-adjusting zone 272, a developing zone 274 and a developer removing zone 276 are located in this order as viewed from the rotating direction of the sleeve member 266 shown by an arrow 264. The developer drawing zone 270 is disposed in one side portion (the right side portion in FIG. 7) of the sleeve member 266, and the brush length-adjusting zone 272 is provided in approximately the topmost portion of the sleeve member 266. The developing zone 274 is disposed in the other side portion (the left side portion in FIG. 7) of the sleeve member 266. Conveniently, the developer removing zone 276 is provided in the one side portion of the sleeve member 266 and below the developer drawing zone 270.

A brush length-adjusting member 278 is provided in the brush length-adjusting zone 272. In the illustrated embodiment, a suspended piece extending downwardly from the under surface of a member 280 secured to the inner surface of the side wall 256 forms the brush length-adjusting member 278. The tip of the brush length-adjusting member is in approximity to the sleeve member 266 in its circumferential direction with some clearance which may, for example, be about 1 mm. In the developing zone 274, the peripheral surface of the sleeve member 266 faces the peripheral surface of the rotating drum 64 with some clearnace through an opening 282 defined between the lower end edge of the side wall 256 and one edge of the bottom wall 254.

Figure 8:
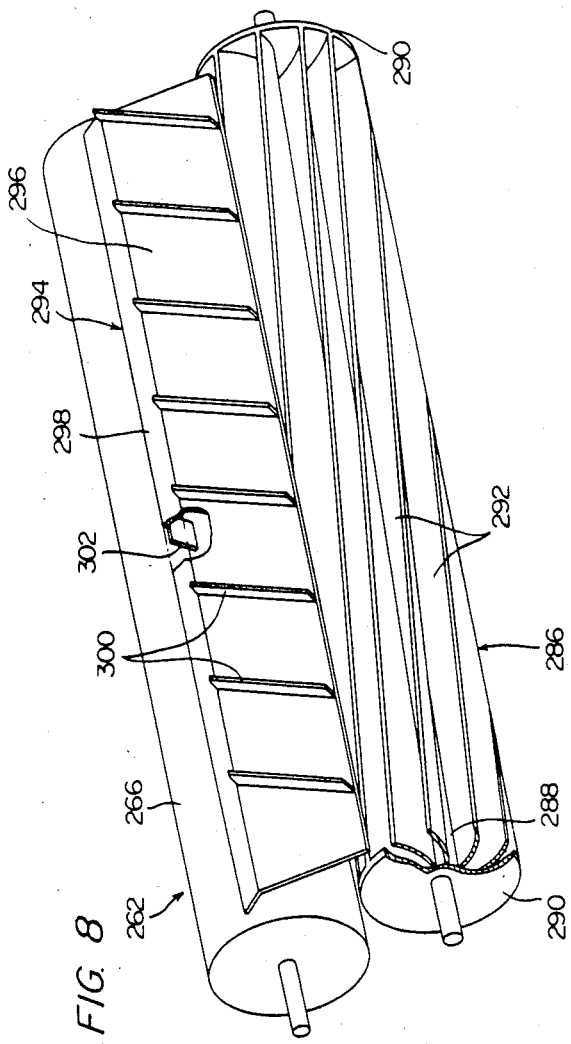
FIG. 8 is a perspective view, partly broken away, of a rotary stirring mechanism and a partitioning plate of the developing device of FIG. 7.

Within the development housing 258, there is disposed a developer agitating means comprised of a rotary agitating mechanism 286 adapted to be rotated in the same direction as the rotating direction of the sleeve member 266 shown by the arrow 264. As is clear from FIG. 7, the rotary agitating mechanism 286 is positioned so as to adjoin the sleeve member 266 in a region ranging from the developer removing zone 276 to the developer drawing zone 270. With reference to FIG. 8 taken in conjunction with FIG. 7, the illustrated rotary agitating mechanism 286 has a rotating shaft portion 288 extending substantially parallel to the axis of rotation of the sleeve member 266, circular end plate portions 290 fixed respectively to the opposite end portions of the rotating shaft portion 288, and a plurality of (12 in the illustrated embodiment) agitating blade portions 292 extending between the two end plate portions 290 at circumferentially spaced positions. Each of the agitating blade portions 292 in the radial direction extends from its inside end connected to the rotating shaft portion 288 to its outside end in a concabe shape. In the front-rear direction (a direction perpendicular to the sheet surface in FIG. 7), it extends from its front end side to its rear end side while it is inclined on the upstream side as viewed in the rotating direction shown by an arrow 284.

A partitioning plate 294 is also provided in the development housing 258. The ijlustrated partitioning plate 294 has an inclined portion 296 extending upwardly from its lower end located above the rotary agitating mechanism 286 while it is inclined to the left in FIG. 7, and a horizontal upper end portion 298 extending from this inclined portion 296 substantially horizontally to the left in FIG. 7. The horizontal upper end portion 298 is located somewhat upstream of the brush length-adjusting zone 272 in which the brush length-adjusting member 278 is located. As clearly shown in FIG. 8, a plurality of (8 in the drawing) guide protrusions 300 spaced from each other in the widthwise direction of the upper surface of the inclined portion 296 (i.e., the front-rear direction perpendicular to the sheet surface in FIG. 7) are provided on the upper surface of the inclined portion 296. Each of the guide protrusions 300 is inclined from its rear end toward its front end in the direction of its lower end, i.e. toward the rotary agitating mechanism 286. A relatively narrow projecting piece 302 extending downwardly from its nearly intermediate portion in its widthwise direction is provided in the upper edge of the horizontal upper end portion 298 of the partitioning plate 294. The lower end of the projecting piece 302 approximates the peripheral surface of the sleeve member 266 preferably at an angular position at which one of the magnetic poles of the stationary permanent magnet 268 is located, or its vicinity. The distance between the lower end of the projecting piece 302 and the peripheral surface of the sleeve member 266 is smaller than that between the lower end of the brush length-adjusting member 278 and the peripheral surface of the sleeve member 266, and is desirably about 0.5 mm, for example.

Figure 9:
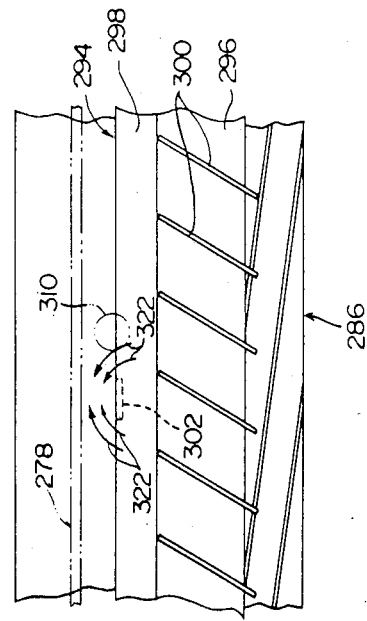
FIG. 9 is a top plan view of a part of the partitioning plate and the rotary sirring mechanism of the developing device of FIG. 7.

To the top of the member 280 is fixed a contact-type developer detector 304 of a known type which detects the inductance of the developer 260 corresponding to the ratio between the carrier particles and the toner particles. It will be readily understood with reference to FIGS. 7 and 9 that a circular opening 306 is formed in the member 280, and a circular detecting portion 308 of the developer detector 304 is located in the opening 306. The lower end surface of the circular detecting portion 308 constitutes a developer contacting surface 310, and the developer detector 304 detects the inductance of the developer 260 contacting the developer contacting surface 310. As illustrated in FIG. 9, the developer contacting surface 310 is positioned preferably adjacent to the one side of the projecting piece 302 mentioned above as viewed in the widthwise direction (i.e., the front-rear direction).

A toner particle receptacle 314 for accommodating toner particles is disposed in the upper portion of the development housing 258, and a toner particle discharge opening 316 is formed in the lowermost portion of the toner particle receptacle 314. Preferably, the toner particle discharge opening 316 is located above the rotary agitating mechanism 286 and adjacent to the lower end of the paritioning plate 294. A toner particle feed means 318 is annexed to the toner particle discharge opening 316. In the illustrated embodiment, the toner particle feed means 318 is comprised of a toner particle feed roller 320 rotatably mounted just above the toner particle discharge opening 316. Many depressed portions or grooves are formed on the peripheral surface of the toner particle feed roller 320. The toner particle feed roller 320 is selectively rotated in the direction shown by an arrow 370 according to the inductance of the developer detected by the developer detector 304. As a result, toner particles 3212 are received in many depressed portions or grooves present on the peripheral surface of the toner particle feed roller 320 and carried to the toner particle discharge opening 316, and then through the toner particle discharge opening 316, are caused to flow onto the rotary agitating mechanism 286. Thus, the toner particles 312 are fed into the developer receptacle 259 from the toner particle receptacle 314. Means for selectively rotating the toner particle feed roller 320 according to the inductance of the developer detected by the developer detector 304 will be described hereinafter.

In the developing device 72 described above, the rotation of the sleeve member 266 of the developer applicator means 262 in the direction of arrow 264 brings about the following actions. With reference to FIG. 7, in the developer drawing zone 270, a part of the developer 260 present in the developer receptacle 259 is attracted to, and held on, the peripheral surface of the sleeve member 266 by the magnetic attracting force of the stationary permanent magnet 268. The developer 260 held on the peripheral surface of the sleeve member 266 is gradually raised by the rotation of the sleeve member 266 and carried to the brush length-adjusting zone 272. As will be readily understood from FIG. 7, the developer 260 moves below the partitioning plate 294 at this time. Slightly upstream of the brush length-adjusting zone 272 is located the relatively narrow projecting piece 302 approximating the peripheral surface of the sleeve member 266. By the action of the projecting piece 302 upon the developer 260 held on the peripheral surface of the sleeve member 266, a considerable amount of the developer 260 is removed from the peripheral surface of the sleeve member 266 at its central portion in the front-rear direction (the direction perpendicular to the sheet surface in FIG. 7) at which the projecting piece 302 exists. As shown by an arrow 322 in FIG. 9, however, the developer 260 flows inwardly in the front-rear direction from both sides of the projecting piece 302 downstream of the projecting piece 302, and therefore even at the central portion in the front-rear direction, a considerable amount of the developer 260 is held on the peripheral surface of the sleeve member 266. The advantage obtained by the flowing of the developer 260 in the direction of arrow 322 which is caused by the projecting piece 302 will be described hereinafter.

In the brush length-adjusting zone, the brush length-adjusting member 278 acts on the developer 260 held on the peripheral surface of the sleeve member 266 to remove the excess of the developer 260 therefrom and adjusts the thickness of the layer of the developer 260 held on the peripheral surface of the sleeve member 266, i.e. the brush length, to a required value. The developer 260 removed from the peripheral surface of the sleeve member by the action of the brush length-adjusting member 278 is conducted to the surface of the horizontal upper end portion 298 of the partitioning plate 294 and then flows over the inclined portion 296 and onto the rotary agitating mechanism 286. The developer 260 which has been removed from the peripheral surface of the sleeve member 266 and introduced into the horizontal upper end portion 298 contacts the developer contacting surface 310 of the developer detector 304, and therefore, the developper detector 304 detects the inductance of the developer 260.

The developer 260 held on the peripheral surface of the sleeve member 266 is then carried to the developing zone 274 by the rotation of the sleeve member 266 and brought into contact with the photosensitive member on the rotating drum 64 rotating in the direction of arrow 66. Consequently, the toner particles in the developer 260 are applied to a latent electrostatic image on the photosensitive member and the image is developed into a toner image.

Subsequently, the developer 260 held on the peripheral surface of the sleeve member 266 is carried to the developer removing zone 276 by the rotation of the sleeve member 266. In the developer removing zone 276, no magnetic pole exists in the stationary permanent magnet, and therefore its magnetic attracting force is extremely small. Moreover, the flow of the developer 260 agitated by the rotary agitating mechanism 286 rotating in the direction of arrow 284 acts on the peripheral surface of the sleeve member 266. Accordingly, the developer 260 is removed from the peripheral surface of the sleeve member 266 in the developer removing zone 276.

The rotary agitating mechanism 286 rotating in the direction of arrow 284 agitates the developer 260 removed from the sleeve member 266 in the developer removing zone 276, the developer 260 flowing onto the rotary agitating mechanism 286 after flowing over the partitioning plate 294, and the toner particles 312 which flow onto the rotary agitating mechanism 286 from the toner particle discharge opening 316 of the toner particle receptacle 314 by the action of the selectively rotated toner particle feed roller 320, and thus uniformly mixes the carrier particles and the toner particles in the developer 260 and triboelectrically charges the toner particles to a specified polarity. Thereafter, it feeds the developer to the developer drawing zone 270.

As clearly shown in FIGS. 8 and 9, the plurality of guide protrusions 300 spaced from each other in the widthwise direction are provided on the upper surface of the inclined portion 296 of the partitioning plate 294. Each of the guide protrusions 300 is inclined from its rear end to its front end toward the rotary agitating mechanism 286. Hence, the developer 260 which flows over the partitioning plate 294 and onto the rotary agitating mechanism 286 is moved from its rear end to its front end. On the other hand, each of the plurality of the agitating blade portions 292 provided in the rotary agitating mechanism 286 extends inclinedly from its front end toward its rear end in the upstream direction as viewed in the rotating direction shown by the arrow 284. Accordingly, the developer 260 carried in the direction of arrow 284 by the rotary agitating mechanism 286 is moved from the front end to the rear end of each agitating blade. Thus, in the illustrated developing device 72, the developer 260 is mixed also in the widthwise direction (i.e., the front-rear direction perpendicular to the sheet surface in FIG. 7) and fully made uniform in the widthwise direction as well. It has already been known to mix a developer in the widthwise direction by the action of a combination of a plate-like member having a plurality of inclined guide protrusions on its upper surface and a rotary agitating mechanism. However, in the known technique, the agitating blade portions formed in the rotary agitating mechanism are spaced from each other in the widthwise direction and are helical in shape. Hence, the effect of movement of the developer from one end to the other by the rotary agitating mechanism is not entirely sufficient, and therefore, the mixing of the developer in the widthwise direction is not sufficient. In contrast, in the developing device 72 described above which has been improved in accordance with the present invention, each of the plurality of agitating blade portions 292 provided in the rotary agitating mechanism 286 extends continuously in an inclined manner from one end to the other. For this reason, the developer 260 is moved sufficiently effectively from one end to the other by the action of the rotary agitating mechanism 286, and therefore fully mixed and made uniform in the widthwise direction.

In the illustrated developing device 72, the developer 260 is mixed in the widthwise direction by the combined action of the partitioning plate 294 having the inclined guide protrusions 300 and the rotary agitating mechanism 286 having the special agitating blade portions 292. If desired, instead of this arrangement, it is possible to provide two rotary agitating mechanism having special agitating blade portions side by side and mix the developer in the widthwise direction by the combined action of the two rotary agitating mechanisms. It is of course important in this case that the agitating blade portions in one rotary agitating mechanism should be inclined upstream in the rotating direction from one end to the other and the agitating blade portions in the other rotation rotary agitating mechanism should be inclined downstream in the rotating direction from one end to the other, in order for one rotary agitating mechanism to move the developer from one end to the other and the other rotary agitating mechanism to move it from the other end to one end.

In the aforesaid developing device 72, the following points should also be noted. Specifically, the developer detector 304 should detect the developer 260 which has been sufficiently agitated and mixed. Otherwise, it is impossible to detect a value corresponding to the actual ratio between carrier particles and toner particles in the developer 260. Furthermore, the developer 260 detected by the developer detector 304 should be the one immediately after mixing and should not be the one which has a tendency to reside at a specified locality of the developer receptable. When the developer 260 detected has a tendency to reside at a specified locality of the developer receptacle 259, it will be readily seen that the detector cannot detect the actual ratio which varies with the performance of development. Furthermore, as a matter of course, the contacting of the developer 260 with the developer contacting surface 310 of the developer detector 304 should not adversely affect the developing action. In the developing device 72 described above which has been improved by the present invention, the developer 260 which has been fully agitated and mixed by the rotary agitating mechanism 286, fed to the developer drawing zone 270, carried to the brush length-adjusting zone 272 while being held onto the peripheral surface of the sleeve member 266, removed from the peripheral surface of the sleeve member 266 by the action of the brush length-adjusting member 278 in the brush length-adjusting zone 272, and introduced onto the partitioning plate 294 is brought into contact with the developer-contacting surface 310 of the developer detector 304. Accordingly, the developer 260 which has just been agitated and mixed sufficiently and having substantially the same carrier-toner ratio as the developer 260 carried to the developing zone 274 from the brush length-adjusting zone 272 makes contact with the developer contacting surface of the developer detector 304. Furthermore, the developer 260 to be contacted with the developer-contacting surface 310 of the developer detector 304 while being held on the peripheral surface of the sleeve member 266 is gradually raised from the developer drawing zone 270 to the upstream side of the brush length-adjusting zone 272 against the action of gravity. Then, by the action of the brush length-adjusting member 278, its moving direction is forcibly reversed, and then it is introduced onto the partitioning plate 294. Accordingly, the developer 260 contacting the developer-contacting surface 310 is caused to flow very well without stagnation. Furthermore, in the illustrated embodiment, the projecting piece 302 is provided slightly upstream of the brush length-adjusting zone 272, and owing to the presence of the projecting piece 302, the flow of the developer 260 in the direction of arrow 322 in FIG. 9 is forcibly formed, as sated hereinabove. As shown in FIG. 9, the developer contacting surface 310 of the detector 304 is positioned adjacent to one side of the projecting piece 302. Hence, the developer 260 present near the developer-contacting surface 310 flows more accurately under the influence of the flow of the developer 260 shown by arrow 322 in FIG. 9. Furthermore, since the developer 260 contacting the developer-contacting surface 310 has been removed from the peripheral surface of the sleeve member 266 by the action of the brush length-adjusting member 278 in the brush length-adjusting zone 272, there is no likelihood that development in the developing zone 274 will be adversely affected by the contacting of the developer 260 with the developer contacting surface 310 of the developer detector 304. For the foregoing reason, the inductance of the developer 260 can be properly detected by the developer detector 304 without adversely affecting the developing zone 274 in the developing device 72 in accordance with this invention.

The toner particle feed roller control means in the developing device 72 will be described in detail.

Figure 10:
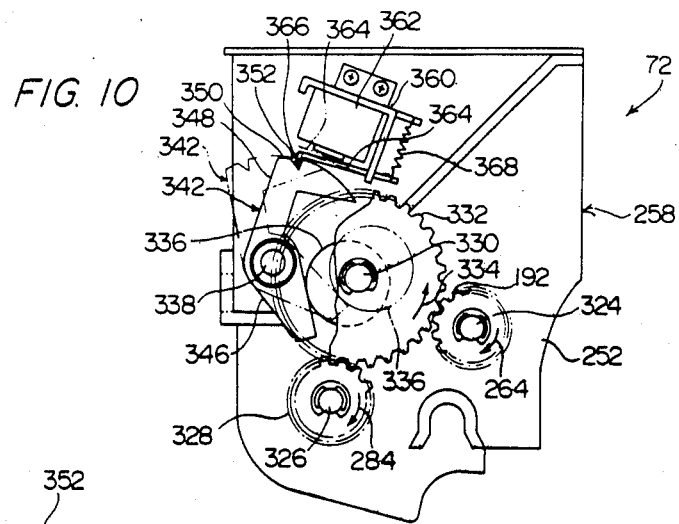
FIG. 10 is a rear view of the developing device of FIG. 7.

This control means controls the rotation of the toner particle feed roller 320 according to the inductance of the developer 260 detected by the developer detector 304, and therefore controls the supplying of toner particles from the toner particle receptacle 314 to the developer receptacle 259 according to variations in the ratio of the carrier particles and the toner particles in the developer, thereby maintaining the ratio of the carrier particles and the toner particles in the developer 260 at a specified value within a required range. With reference to FIGS. 7 and 10, the rotating shaft 324 to which the sleeve member 266 is fixed projects rearwardly beyond the rear wall 252 of the development housing 258, and the gear 192 already referred to with reference to FIG. 3 (i.e., the gear 192 in the power transmission mechanism 168 for the developing device) is fixed to the projecting end portion of the rotating shaft 324. The rotating shaft 326 having the rotary agitating mechanism 286 fixed thereto also projects rearwardly beyond the rear wall 252 of the development housing 258, and a gear 328 is fixed to the projecting end portion of the rotating shaft 326. A short shaft 330 is fixed to the rear wall 252 of the development housing 258, and a gear 332 is rotatably mounted on the short shaft 330. The gear 332 is in mesh with both the gear 192 and the gear 328. Accordingly, when the gear 192 and the sleeve member 266 are rotated in the direction of arrow 264 by the driving force transmitted from the driving source 144 (FIG. 3), the gear 332 is rotated in the direction shown by an arrow 334, and the gear 328 and the rotary agitating mechanism 286 are rotated in the direction of arrow 284.

Figure 11:
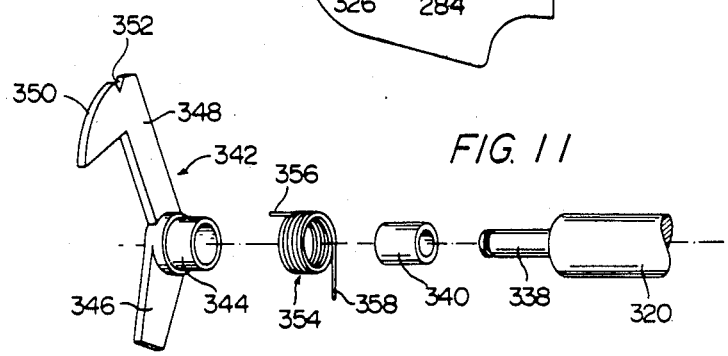
FIG. 11 is an exploded perspective view showing some constituent elements of means for controlling a toner particle supplying roller used in the developing device of FIG. 7.

A cam 336 constituting part of the toner particle feed roller control means is also mounted on the short shaft 330 so that it can rotate as a unit with the gear 332. Conveniently, the cam 336 is an eccentric cam formed of a disc mounted eccentrically on the short shaft 330. The rotating shaft 338 to which the toner particle feed roller 320 is fixed also projects rearwardly beyond the rear wall of the toner particle receptacle 314. With reference to FIGS. 10 and 11, a one-way clutch 340 known per se is mounted on the projecting end portion of the rotating shaft 338, and a lever member 342 is mounted to the one-way clutch 340. The lever member 342 includes a hub portion 344 to be received about the one-way clutch 340, a cam follower portion 346 extending radially outwardly from the hub portion 344 and a restrained portion 348. The restrained portion 348 is nearly hool-shaped, and its peripheral edge defines an arcuate edge 350 with the central axis of the rotating shaft 338 as a center. A notch 352 is formed in the arcuate edge 350. A spring member 354 which may be a helical spring is received about the hub portion 344 of the lever member 342. One end 356 of the spring means 354 is engaged with one edge of the restrained portion 348 of the lever member 342, and its other end 358, with a suitable engaging projection (not shown) provided in the rear surface of the rear wall 252 of the development housing 258. Thus, the spring means 354 elastically biases the lever member 342 counterclockwise in FIG. 10 to cause one side edge of the cam follower portion 346 of the lever member 342 to abut against the peripheral edge of the cam 336. A securing bracket 360 is also fixed to the rear surface of the rear wall of the toner particle receptacle 314. An electromagnetic means 362 which may be a solenoid is secured to the securing bracket 360. Furthermore, a restraining member 364 is mounted on the securing bracket 360 so that it can freely pivot between an operating position shown by a solid line in FIG. 10 and a non-operating position shown by a two-dot chain line in FIG. 10. One end of the restraining member 364 has formed therein a projection 366 which cooperates with the notch 352 formed in the arcuate edge 350 of the restrained portion 348 of the lever member 342 when the restraining member 364 is at the operating position. A spring means 368 which may be a tension coil spring is stretched across the other end portion of the restraining member 364 and the securing bracket 360. The spring means 368 elastically biases the restraining member 364 to the operating position.

In the toner particle supply roller control means described above, the electromagnetic means 362 is adapted to be energized and deenergized according to the characteristic value of the developer 260 detected by the developer detector 304, and therefore to the ratio of the carrier particles and the toner particles in the developer 260. When the electromagnetic means 362 is energized, the restraining member 364 is pivoted to the non-operating position shown by the two-dot chain line in FIG. 10 against the elastic biasing action of the spring means 368. As a result, the projection 366 of the restraining member 364 comes out of engagement with the notch 352 formed in the restrained portion 348 of the lever member 342 and the restraining of the lever member 342 by the restraining member 364 is cancelled. Consequently, the lever member 342 is reciprocated between one limit angular position shown by a solid line in FIG. 10 and another limit angular position shown by a two-dot chain line in FIG. 10 by the cooperation of the cam 336 rotated in the direction of an arrow 334 with the spring means 354 for elastically contacting the cam follower portion 346 of the lever member 342 with the peripheral edge of the cam 336. When the lever member 342 is pivoted from the other limited angular position to the one limit angular position clockwise in FIG. 10, the pivotal movement of the lever member 342 is transmitted to the rotating shaft 338 through the one-way clutch 340, and the toner particle supply roller 320 is rotated in the direction of an arrow 370 (FIG. 7). On the other hand, when the lever member 342 is pivoted counterclockwise in FIG. 10 from the one limit angular position to the other limit angular position, the one-way clutch 340 does not transmit its pivotal movement to the rotating shaft 338, and therefore, the toner particle supply roller 320 is not rotated. Thus, when the lever member 342 is reciprocally pivoted between the one limit angular position to the other limit angular position, the toner particle supply roller 320 is intermittently rotated in the direction of arrow 370.

When the electromagnetic means 362 is deenergized, the spring means 368 elastically biases the restraining member 364 toward the operating position shown by the solid line in FIG. 10, and pushes the projection 366 of the restraining member 364 against the arcuate edge 350 of the restrained portion 348 of the lever member 342. When in this state the lever member 342 is held at the one limit angular position shown by the solid line in FIG. 10 at which the largest diameter portion of the cam 336 acts on the cam follower portion 346 of the lever member 342, the restraining member 364 is held at the position shown by a solid line in FIG. 10, and the projection 366 of the restraining member 364 is engaged with the notch 352 formed in the arcuate edge 350 of the restrained portion 348 of the lever member 342. As a result, the lever member 342 is restrained at the aforesaid one limit angular position, and in spite of the rotation of the cam 336, the lever member 342 is not pivoted and therefore the toner particle feed roller 320 is not rotated.

It may be possible in the aforesaid toner particle feed roller controlling means to omit the restraining member 364 and the spring means 368 and cause the electromagnetic means 362 to act directly on the lever member 342 so that when the electromagnetic means 360 is energized the lever member 342 is restrained at the one limit angular position shown by the solid line in FIG. 10. However, this requires a relatively strong and expensive electromagnetic means which restrains the lever member 342 at the one limit angular position directly in resistance to the relatively strong spring means 354 that elastically biases the lever member 342 counterclockwise in FIG. 10 and contacts the cam follower portion 346 of the lever member 342 with the peripheral edge of the cam 336. As a result, the toner particle feed roller control means will become relatively expensive. In contrast, in the toner particle feed roller controlling means described above, the electromagnetic means 362 needs only to be able to hold the restraining member 364 at the non-operating position shown by the two-dot chain line in FIG. 10 against the elastic biasing force of the spring means 368 which may be relatively weak. Accordingly, the toner particle feed roller controlling means may be one which is relatively weak and inexpensive.

Fixing Device

In the fixing device used in the electrostatic copying apparatus described above, a toner image on a sheet meterial is fixed on its surface by conveying the sheet material having the toner image transferred in the transferring zone between a pair of fixing rollers. Generally, in such a fixing device, the downstream end of a guide member provided upstream of the pair of fixing rollers for guiding the sheet material to the fixing rollers (i.e., that end of the guide member which is in proximity to the pair of fixing rollers) is positioned above the nip position of the pair of fixing rollers. When the downstream end of the guide member is so positioned, a sheet material of relatively low stiffness which is frequently used is bent by the downstream end of the guide member, and by this bending action, creases of that portion of the sheet material which is introduced between the fixing rollers are straightend, and it is possible to prevent the occurrence of creases on the sheet material during fixing by the fixing rollers. On the other hand, when a sheet material having relatively high stiffness [for example, an official postal card (which is not often used)] is used, the leading end of the sheet material contacts the upper fixing roller in the fixing roller pair and conveying of the sheet material may fail (jamming occurs). Or the trailing end portion of the sheet may abruptly rise upstream of the downstream end of the guide member to disturb the unfixed toner image on the sheet material.

In an attempt to remove the foregoing inconvenience, Japanese Laid-Open Utility Model Publication No. 66947/1978, for example, proposes a fixing device in which a notch or a depressed portion is formed centrally in the downstream end of a guide member for guiding a sheet material to a pair of fixing rollers so that the central portion of the sheet material carried between the fixing rollers can sag down. Elsewhere, Japanese Laid-Open Utility Model Publication No. 3558/1981 proposes a fixing device in which a guide portion for conducting a sheet material having relatively high stiffness to the nipping position of a pair of fixing rollers is provided in a guide member for guiding a sheet material to the fixing rollers.

In the fixing devices disclosed in the specifications of Japanese Laid-Open Utility Model Publications Nos. 66947/1978 and 3558/1981, a sheet material having a relatively small size and relatively high stiffness can be conveyed to near the nip position of the pair of fixing rollers, and the toner image can be fixed on it well. But a sheet material having a relatively small size and relatively low stiffness is not bent at the downstream end of the guide member and creases are likely to form on the sheet material during fixing by the pair of fixing rollers.

The fixing device constructed in accordance with the present invention has the following improvement in order to remove the aforesaid inconvenience.

Figure 13:
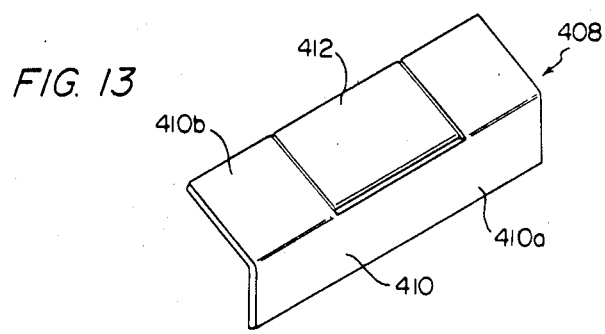
FIG. 13 is a perspective view showing a guide member.

With reference to FIGS. 12 to 14, the fixing device improved in accordance with this invention will be described below in detail.

With reference to FIG. 12, the fixing device 130 has a fixing roller pair composed of an upper roller 136 and a lower roller 138 cooperating with each other. In the illustrated embodiment, the upper roller 136 to be driven in the direction of an arrow 403 is constructed of a cylindrical sleeve member 402 made of aluminum having a surface coated with "Teflon" (a tradename for polytetrafluoroethylene made by E. I. du Pont de Nemours & Co.), and the lower roller 138 is constructed of a metallic pipe member 404 surface-coated with rubber, etc. Within the upper roller 136 is disposed an electrical heating element 406 such as an electric heater for fixing the toner image on the sheet material under heat.

Upstream of the fixing roller pair is disposed a guide member 408 for conducting a sheet material conveyed by the action of the conveyer belt mechanism 128 to the fixing roller pair. As shown in FIG. 13, the guide member 408 has a main guide 410 formed of a rigid material such as a metallic material and a guide 412 made of a flexible material. The main guide 410 has a securing portion 410a (constituting the securing portion of the guide member 408) and a guiding portion 410b extending from the securing portion 410a. A rectangular cut having a predetermined width is provided in the central part of the guiding portion 410b in the widthwise direction (the direction perpendicular to the sheet surface in FIG. 12 and the direction from left bottom to the right top in FIG. 13) (more specifically, the cut is formed from the upstream end to the downstream end of the guiding portion 410). The guide 412 is disposed in the aforesaid cut by fixing its upstream end to the securing portion 410a of the main guide 410. Thus, the guide 412 and the guiding portion 410b of the main guide 410 constitutes the guiding portion of the guide member 408, and the guide 412 defines a specified area of the guiding portion of the guide member 408. Preferably, the upper surface of the guide 412 is disposed in the same plane as the upper surface of the guiding portion 410b of the main guide 410. Preferably, the guide 412 of a flexible material is a polyester film having a thickness of about 0.1 mm (for example, those commercially available under the tradenames "Lumilar" and "Mylar"). In the illustrated embodiment, a sheet material having relatively high stiffness is assumed to be an official post card, and the width of the aforesaid specified area is set at about 100 mm (substantially equal to, or slightly larger than, the width of the official post card).

The guide member 408 consisting of the main guide 410 and the guide 412 is fixed to a supporting vertical wall provided in the bottom wall portion 14 which defines the bottom surface of the housing 2 (FIG. 1). As is clear from FIG. 12, the guiding portion of the guide member 408 extends upwardly inclinedly toward the downstream side (more specifically, toward the downstream side in the conveying direction of the sheet material shown by an arrow 414), and its lower end portion is positioned slightly above the nip position of the fixing roller pair (the upper roller 136 and the lower roller 138) and in proximity to the peripheral surface of the upper roller 136. The upstream end (that end which is in proximity to the conveying belt mechanism 128) of the guiding portion of the guide member 408 is positioned below the nip position of the fixing roller pair.

The illustrated conveying belt mechanism 128 includes a pair of rollers 416 (FIG. 1) and an endless conveying belt 418 having a plurality of holes formed therein. The conveyor belt 418 is stretched across the rollers 416, and a suction chamber 420 is disposed between the upper portion (the portion acting for conveying the sheet material) and the lower portion of the conveyor belt 418. That surface of the suction chamber 420 which faces the upper portion of the conveyor belt 418 is opened. The inside of the suction chamber 420 is sucked by a suction motor (not shown), and by the sucking action of the suction motor, the sheet material conveyed on the upper portion of the conveyor belt 418 is attracted to the conveyor belt 418.

In the fixing device 130 described above, the sheet material having a toner image on its upper surface which is conveyed on the conveyor belt 418 is conducted to the fixing roller pair by being guided by the upper surface of the guiding portion of the guide member 408. By the fixing action of the fixing roller pair, the toner image is fixed to the surface of the sheet material.

The operation and advantage of the fixing device 130 including the guide member 408 described above will be described with reference to FIGS. 12 to 14.

Let us first assume that a sheet material having a relatively large width (more specifically larger than the width of the aforesaid specified area in the transverse direction) is used. As can be easily understood from FIG. 13, the sheet material is raised while being guided mainly by the upper surface of the guiding portion 410b of the main guide 410 of the guide member 408, and thereafter, lowered and conducted to the nip position of the fixing roller pair (the upper roller 136 and the lower roller 138). Accordingly, the sheet material is conveyed as shown by a two-dot chain line in FIG. 12 and bent by the downstream end of the guiding portion 410b of the main guide 410. Creases will be straightened by this bending action. As a result, the sheet material can be introduced between the fixing rollers after its creases have been removed, and the occurrence of creases in the sheet material during the fixing operation can be prevented.

Now, let us assume that a sheet material having a relatively small width (more specifically smaller than the width of the aforesaid specified area in the transverse direction) and relatively high stiffness (generally sheet materials having relatively high stiffness mostly have a large weight), for example, an official post card, is used. As can be readily understood from FIG. 13, the sheet material is conducted to the nip position of the fixing roller pair by being guided by the upper surface of the guide 412 (the specified area). When the sheet material is guided over the upper surface of the guide 412, the downstream end portion of the guide 412 is bent downwardly by the weight of the sheet material as shown in FIG. 14 because the guide 412 is made of a flexible material. Thus, the downstream end of the guide 412 is at nearly the same height as the nip position of the fixing roller pair. Accordingly, the sheet material is conveyed as shown by a two-dot chain line in FIG. 14 and conveyed to the nip position of the fixing roller pair nearly in a straight line fashion without being bent by the downstream end of the guide 412. Thus, sheet jamming and disturbance of the unfixed toner image, which may occur when a sheet material having relatively high stiffness is used, can be prevented.

Now, let us assume that a sheet material having a relatively small width (more specifically, smaller than the width of the specified area in the transverse direction) and relatively low stiffness (generally sheet materials having relatively low stiffness have a small weight) is used. The sheet material in this case is brought to the nip position of the fixing roller pair while being guided by the upper surface of the guide 412 (specified area). But since its weight is small, the downstream end portion of the guide 412 is not so much bent downwardly when the sheet material is guided over the upper surface of the guide 412. The sheet material is raised by being guided by the upper surface of the guide 412 and then lowered and conducted to the nip position of the fixing roller pair. Accordingly, the sheet material is conveyed as shown by a two-dot chain line in FIG. 12 and bent by the downstream end of the guide 412. Creases in the sheet material will be straightened by this bending action. In this case, too, the sheet material can be passed between the fixing rollers after its creases have been removed.

In the embodiment described above, the guide 412 (specified area) is disposed in the central portion of the guiding portion of the guide member 408 in the widthwise direction. When a sheet material having a relatively small size is to be guided on the upper surface of the left side portion (or the right side portion) in the widthwise direction of the guiding portion of the guide member 408, the guide 412 may be provided in the left side portion (or the right side portion) in the widthwise direction of the guiding portion of the guide member 408.

The above embodiment is applied to a fixing device including an electrical heating element. It can, however, be also applied to a fixing device of the pressure type which is adapted to fix the toner image on the sheet material only by the pressure between the fixing rollers.

Controlling of the Fixing Device Based on Temperature

In an electrostatic copying apparatus having a fixing device equipped with an electrical heating element such as an electric heater, the type described hereinabove, varuous improvements have been suggested for saving power consumption. For example, Japanese Laid-Open Patent Publication No. 92558/1981 discloses an electrostatic copying apparatus including a timer circuit which starts its operation when the temperature of an electrical heating element reaches a predetermined temperature after closing a power supply switch or when the copying cycle has ended, and generates a signal when the above operation continued for a preset period of time; a reset means for resetting the timer circuit when a copying cycle signal is generated within the period of time preset in the timer circuit; and a current shutting means for shutting the passing of an electric current to the electrical heating element when the signal is outputted from the timer circuit. In the electrostatic copying apparatus disclosed in this patent document, the timer circuit operates when the temperature of the electrical heating element reaches a predetermined point after closing the power supply switch or the copying cycle has ended. When thereafter no copying cycle signal is gnerated within a predetermined period of time, a signal is outputted by the timer circuit to cut off the passing of a current to the electrical heating element. Thus, after the lapse of a predetermined period of time from the operation of the timer circuit, power consumption by the electrical heating element is prevented.

In the above electrostatic copying apparatus, when a predetermined period of time elapses without resetting after the actuation of the timer circuit, the passing of an electric current to the electrical heating element is shut off. On the other hand, when a copying cycle signal is generated within the predetermined period of time after the actuation of the timer circuit, the timer circuit is reset, and the electrical heating element continues to be maintained at a predetermined temperature. Accordingly, the power consumption by the electrical heating element is not sufficiently reduced, and it is still desired to reduce power consumption more effectively without affecting the fixing operation.

To solve the aforesaid problem, the electrostatic copying apparatus having the fixing device equipped with the electrical heating element constructed in accordance with this invention is improved in the following respect.

With reference to FIGS. 15 to 17, the electrostatic copying apparatus including the fixing device 130 with the electrical heating element 406 comprises a temperature detecting means for detecting the temperature of the fixing device 130 at a predetermined position. In the illustrated embodiment, the temperature detecting means is comprised of a thermistor 430 whose resistance value decreases with an increase in temperature. As shown in FIG. 12, the thermistor 430 is provided in proximity to the peripheral surface of the upper roller 136 of the fixing roller pair (and therefore, the thermistor 430 detects the temperature of the surface of the upper roller 136 or its vicinity). With reference to FIG. 15, one terminal of the thermistor 430 is connected to a power supply E via a resistance $R_1$, and the other terminal is connected to one input terminal of each of a first comparator 432 and a second comparator 434. One terminal each of a resistance $R_2$ and a condenser C disposed parallel to each other is connected to the connecting portion between the other terminal of the thermistor 430 and the one input terminal of the first comparator 432 and the one input terminal of the second comparator 434. The other terminals of the resistance $R_2$ and condenser C are respectively grounded. A circuit portion including resistances $R_3$, $R_4$ and $R_5$ connected to each other in series is disposed parallel to the aforesaid circuit portion including the resistance $R_1$, the thermistor 430, the resistance $R_2$ and the condenser C. One end of the circuit portion (one terminal of the resistance $R_3$) is connected to a power supply E, and the other terminal (one terminal of the resistance $R_5$) is grounded. The connecting portion between the resistances $R_3$ and $R_4$ is connected to the other input terminal of the first comparator 432, and the connecting portion between the resistances $R_4$ and $R_5$ is connected to the other input terminal of the second comparator 434. Accordingly, the voltage of the other terminal of the thermistor 430 is applied to one input terminal of the first comparator 432, and the voltage of the connecting portion between the resistances $R_3$ and $R_4$ (a first reference voltage) is applied to the other input terminal of the first comparator 432. The first comparator 432 produces a signal "H" when the voltage of the other terminal of the termistor 430 becomes lower than the voltage of the connecting portion between the resistances $R_3$ and $R_4$. The voltage of the other terminal of the thermistor 430 is applied to one input terminal of the second comparator 434, and the voltage (a second reference voltage) of the connecting portion between the resistances $R_4$ and $R_5$ is applied to the other input terminal of the second comparator 434. The second comparator 434 generates a signal "H" when the voltage of the other terminal of the thermistor 430 becomes lower than the voltage of the connecting portion between the resistances $R_4$ and $R_5$. The voltage of the connecting portion between the resistances $R_3$ and $R_4$ and the voltage of the connecting portion between the resistances $R_4$ and $R_5$, i.e. the first and second reference voltages, can be set at desired values by properly selecting the resistance values of the resistances $R_3$, $R_4$ and $R_5$. In the illustrated embodiment, the first reference voltage is set so that it becomes equal to the voltage of the other terminal of the thermistor 430 (and therefore the voltage applied to one input terminal of the first comparator) at which the temperature detected by the termistor 430 is a first predetermined temperature $T_1$ (for example, about 185° C.) suitable for fixation. The second reference voltage is set so that it becomes equal to the voltage of the other terminal of the thermistor 430 (and therefore the voltage applied to one input terminal of the second comparator 434) at which the temperature detected by the thermistor 430 is a second predetermined temperature $T_2$ which does not adversely affect the fixing operation even when the copying cycle is started. Accordingly, when the temperature detected by the thermistor 430 (i.e. the temperature of the surface of the upper roller 136 or its vicinity) is lower than the first predetermined temperature $T_1$, the first comparator 432 generates a signal "H". When the temperature detected by the thermistor 430 is lower than the second predetermined temperature $T_2$, the second comparator 434 generates a signal "H".

The output signals from the first comparator 432 and the second comparator 434 are fed into the aforesaid control means 250 which may preferably be constructed of a microprocessor. A copying cycle signal from a copying cycle signal producing means 438 is also fed to the control means 250. The copying cycle signal producing means 438 is constructed, for example, of a signal producing means which produces a copying cycle signal until the copying cycle has been performed through a preset number of cycles after depression of a copying start switch (not shown). The copying cycle signal producing means 438 may also be adapted to start generation of a copying cycle signal in response not to the closing of the copying start switch but to an operation carried out prior to the starting of the copying cycle, for example, to the operation of a setting key for presetting the number of copies to be produced. Alternatively, the signal producing means 438 may be adapted to produce a copying cycle signal without fail for a predetermined time upon closing of the power supply switch.

On the other hand, in the control means 250, an actuation signal for energizing the electrical heating element 406 (FIG. 12) in relation to the signal "H" from the first comparator 432 is produced in the control means 250, and a power supply shutting signal for opening the power supply switch 440 of the electrostatic copying apparatus in relation to the signal "H" from the second comparator 434 is also generated. The actuation signal is fed to a switch means 442 disposed in a circuit for supplying an electrical current to the electrical heating element 406, and the power supply shutting signal, to the power supply switch 440. The control means 250 illustrated is constructed such that it continues to produce the actuation signal after the closing of the power supply switch 440 until the temperature detected by the thermistor 430 exceeds the first predetermined temperature $T_1$.

With reference to FIGS. 15 and 16, the controlling of the fixing device in the aforesaid electrostatic copying apparatus on the basis of temperature will be described.

When the power supply switch 440 is closed, the control means 250 produces an actuation signal which is then fed into the switch means 442. As a result, the switch means 442 is closed, and an electric current is passed through the electrical heating element 406 via the switch means 442. As a result, the fixing device 130 is heated by the electrical heating element 406 until the temperature detected by the thermistor 430 reaches the first predetermined temperature $T_1$ (about 185° C., for example). Hence, when the power supply switch 440 is closed at time $t_o$, the fixing device 130 is heated by the passing of a current through the electrical heating element 406, and the temperature detected by the thermistor 430 is raised as shown by a solid line in FIG. 16. After the lapse of time $t_{o1}$ from the time $t_o$, the temperature detected by the thermistor 430 reaches the first predetermined temperature $T_1$.

When the temperature detected by the thermistor 430 reaches the first predetermined temperature $T_1$, the voltage of the other terminal of the thermistor (and therefore the voltage applied to one input terminal of the first comparator 432) becomes higher than the voltage of the connecting portion between the resistances $R_3$ and $R_4$ (and therefore the voltage applied to the other input terminal of the first comparator 432), and the feeding of the signal "H" from the first comparator 432 is stopped. As a result, the supplying of the actuation signal to the switch means 442 is stoped, and the switch means 442 is opened to cancel the passing of an electrical current to the electrical heating element 406. Once the temperature detected by the thermistor 430 has reached the first predetermined temperature $T_1$ (the arrival at the first predetermined temperature $T_1$ can be detected by the stopping of the supplying of the signal "H" from the first comparator 432), the electrical heating element 406 is controlled depending upon whether the copying cycle signal producing means 438 produces a copying cycle signal. When the signal producing means 438 is producing a copying cycle signal, the electrical heating element 406 is controlled by the output signal from the first comparator 432, and consequently, the electrical heating element 406 is controlled so that the temperature detected by the thermistor 430 becomes substantially equal to the first predetermined temperature $T_1$. (More specifically, when the means 438 is producing the copying cycle signal, the control means 250 produces an actuation signal on the basis of the signal "H" from the first comparator 432. This actuation signal closes the switch means 442 and energizes the electrical heating element 406. Furthermore, the feeding of the actuation signal is stopped by the stopping of the feeding of the signal "H" from the first comparator 432. This opens the switch means 442 and deenergizes the electrical heating element 406. Thus, the electrical heating element is controlled as stated above.) On the other hand, when the means 438 is not producing the copying cycle signal, the feeding of the actuation signal from the control means 250 is stopped owing to the absence of the copying cycle signal irrespective of the output signals from the first comparator 432 and the second comparator 434, and the switch means 442 is opened to deenergize the electrical heating element. Accordingly, when the copying cycle signal is produced after the temperature detected by the thermistor 430 has exceeded the first predetermined temperature $T_1$, the temperature detected by the thermistor 430 is controlled substantially to the first predetermined temperature $T_1$ as shown by the solid line in FIG. 16. When thereafter the feeding of the copying cycle signal is stopped at time $t_1$, the electrical heating element 406 is deenergized and the temperature detected by the thermistor 430 is lowered as shown by a two-dot chain line in FIG. 16 after time $t_1$.

When the electrical heating element 406 is deenergized and the temperature detected by the thermistor 430 becomes lower than the second predetermined temperature $T_2$ (about 150° C., for example), the voltage of the other terminal of the thermistor 430 (and therefore the voltage applied to one input terminal of the second comparator 434) becomes lower than the voltage of the connecting portion between the resistances $R_4$ and $R_5$ (and therefore the voltage applied to the other input terminal of the second comparator 434), and a signal "H" is fed from the second comparator 434. On the basis of this signal "H", the control means 250 produces a power supply shutting signal which causes opening of the power supply switch 440 (and therefore the feeding of an electric current to the electrostatic copying apparatus is stopped). When after stopping of the feeding of the copying cycle signal at time $t_1$, the means 438 produces a copying cycle signal (produced, for example, by depressing the copying start switch) at time $t_2$ (at which the temperature detected by the thermistor 430 has not been lowered to the second predetermined temperature $T_2$), the electrical heating element 406 is controlled on the basis of the output signal from the first comparator 432, and the temperature detected by the thermistro 430 is raised as shown by a one-dot chain line in FIG. 16 after time $t_2$, and thereafter, the detected temperature becomes substantially equal to the first predetermined temperature $T_1$ as shown by the solid line in FIG. 16. When, for example, the copying start switch (not shown) is depressed at time $t_3$ or later after the stopping of the feeding of the copying cycle signal at time $t_1$, the electrical heating element 406 will not be energized since the power supply switch 440 is off.

When the production of a copying cycle signal is again terminated at time $t_4$ after the production of the copying cycle signal at time $t_2$, the feeding of the actuation signal from the control means 250 is stopped, and the switch means 442 is turned off to deenergize the electrical heating element 406. Accordingly, when the production of the copying cycle signal is again terminated at time $t_4$, the electrical heating element 406 is deenergized and the temperature of the thermistor 430 detected is lowered as shown by the solid line in FIG. 16 after time $t_4$. When the temperature detected by the thermistor 430 becomes lower than the second predetermined temperature $T_2$ at time $t_5$, the power supply switch 440 is turned off to stop feeding an electric current to the electrostatic copying apparatus. To start the copying cycle after the power supply switch 440 has been turned off in this manner, the power supply switch 440 is again closed. As a result, the electrostatic copying apparatus is controlled as stated above.

The electrostatic copying apparatus equipped with the fixing device 130 including the electrical heating element 406 is constructed such that the electrical heating element is deenergized when after the temperature detected by the thermistor 430 has exceeded the first predetermined temperature $T_1$, a copying cycle signal is not produced. Accordingly, wasteful consumption of power by the electrical heating element 406 can be prevented, and the power can be saved more effectively than in the prior art.

Furthermore, the aforesaid fixing device 130 is constructed such that the power supply switch is turned off when the electrical heating element 406 is deenergized and the temperature detected by the thermistor 430 (i.e. the temperature of the surface of the upper roller 136 and its vicinity) is lowered to the second predetermined temperature $T_2$. Hence, it is possible to prevent surely the performance of the fixing operation at a temperature below the second predetermined temperature $T_2$ (the temperature at which fixation is not adversely affected even when the copying cycle is started), and poor fixation can be prevented.

Controlling of the passing of an electric current to the electrical heating element 406 during the generation of the copying cycle signal is not limited to the opening or closing of the switch means 442 by the actuation signal. Alternatively, the number of half cycles of an alternate current fed to the electrical heating element 406 can be controlled on the basis of the output signal from the thermistor 430, or the conducting phase angle of each half cycle of an alternate current fed to the electrical heating element may also be controlled in order to achieve the above purpose.

The above specific embodiment is constructed such that when no copying cycle signal is produced after the temperature detected by the thermistor 430 has exceeded the first predetermined temperature $T_1$, the electrical heating element 406 is deenergized, and when the temperature detected by the thermistor becomes lower than the second predetermined temperature $T_2$, the power supply switch 442 is opened. Alternatively, it is also possible to construct it such that when no copying cycle signal is produced after the detected temperature has exceeded the first predetermined temperature $T_1$, the electrical heating element 406 is deenergized, and when the detected temperature is lowered to the second predetermined temperature $T_2$, it is maintained at the second predetermined temperature $T_2$. This alternative means can also lead to the effective saving of power.

Now, with reference to FIG. 17, the operation and advantage of the above modified embodiment will be briefly described. The control circuit in the modified embodiment is substantially the same as the control circuit of the embodiment shown in FIG. 15 except that the power supply switch 440 is excluded. A description of the structure of the control circuit itself is omitted, but the same parts will be referred to by the same reference numerals. When the power switch 440 is closed at time $t_o$, an actuation signal is generated in the control means 250, and this actuation signal continues to be generated until the temperature detected by the thermistor 430 has exceeded the first predetermined temperature $T_1$ (about 185° C.). As a result, the switch means 442 is closed, and the electrical heating element 406 conducts via the switch means 442, and the temperature detected by the thermistor 430 is raised to the first predetermined temperature $T_1$. When after the lapse of time $t_{o1}$ from the closing of the power supply switch 440 the detected temperature of the thermistor 430 exceeds the first predetermined temperature $T_1$, the electrical heating element 406 is thereafter controlled depending upon whether the copying cycle signal producing means 438 is producing a copying cycle signal or not. When the copying cycle signal is produced even after the detected temperature has reached the first predetermined temperature $T_1$, the electrical heating element 406 is controlled on the basis of the output signal from the first comparator 432. Thus, the electrical heating element 406 is controlled so that the detected temperature of the thermistro 430 becomes substantially equal to the first predetermined temperature $T_1$. On the other hand, when at time $t_1$, the production of the copying cycle signal is terminated, the electrical heating element 406 is controlled on the basis of the output signal from the second comparator 434. Thus, the electrical heating element 406 is deenergized until time $t_2$, and thereafter, controlled so that the temperature detected by the thermistro 430 becomes substantially equal to the second predetermined temperature $T_2$.

When a copying cycle signal is again produced (for example, by depressing the copying start switch), the electrically heating element 406 is controlled on the basis of the output signal from the first comparator 432. Thus, the electrical heating element 406 is energized until time $t_4$ and thereafter controlled again such that the temperature detected by the thermistor 430 becomes substantially equal to the first predetermined temperature $T_1$.

When thereafter the generation of the copying cycle signal is terminated at time $t_5$ and the power supply switch 442 is opened at time $t_7$, feeding of an electrical current to the electrostatic copying apparatus is stopped, whereby the electrical heating element 406 is not energized and the temperature detected by the thermistor 430 is lowered.

ACTUATION CONTROL

Controlling of the actuation of the copying apparatus described above will be described in summary.

With reference to FIG. 1, sheet material detecting switches S1 and S2 are disposed in the sheet material conveying passage. The detecting switch S1 has a detecting arm which slightly upstream of the pair of conveyor rollers 120 and 122, crosses the sheet material conveying passage between the guide plates 114 and 116 and also the sheet material conveying passage between the guide plates 114 and 118. It detects a sheet material fed from the paper feeding device 90 and passing between the guide plates 114 and 116 and also a sheet material fed from the manual feeding device 92 and passing between the guide plates 114 and 118. The detecting switch S2 has an arm which slightly upstream of the pair of feed rollers 110 and 112, crosses a conveying passage for a sheet material inserted between the guide plates 106 and 108, and detects a sheet material positioned on the guide plate 106 and advanced by hand.

Figure 18:
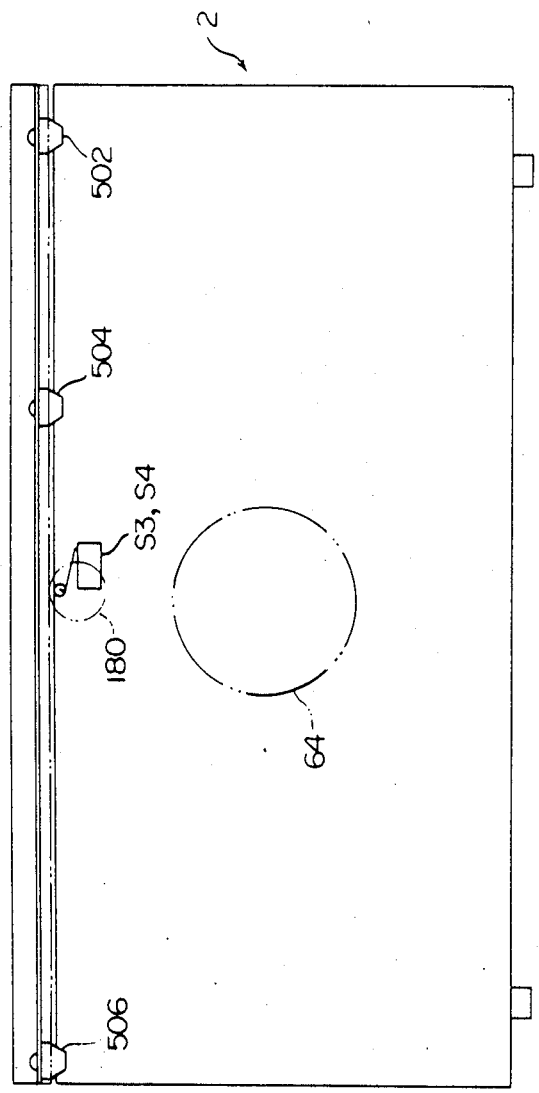
FIG. 18 is a simplified side elevation of a detecting switch provided in relation to a document placing means.
Figure 19:
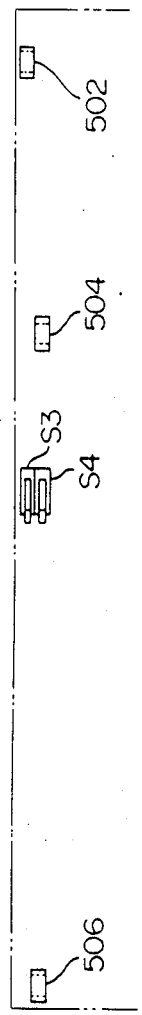
FIG. 19 is a simplified top plan view of the detecting switch shown in FIG. 18.

With reference to FIGS. 18 and 19 taken in conjunction with FIG. 2, document placing mean detecting switches S3 and S4 are disposed below the supporting base plate 50 of the document placing means 48. Actuation pieces 502, 504 and 506 are fixed to the lower surface of the supporting base plate 50. When the document placing means 48 is held at the start-of-scan position shown by the two-dot chain line 48A in FIG. 1, the actuation piece 502 acts on the detecting switch S3 to close it. When the document placing means 48 is moved for scanning exposure by a predetermined distance to the right in FIGS. 1, 18 and 19, the actuating piece 504 acts on the detecting switch S4 to close it. When the document placing means 48 continues to make a scanning exposure movement and is held at the scan exposure movement limit position shown by the two-dot chain line 48B in FIG. 1, the actuating piece 506 acts on the detecting switch S4 to close it (thus, the document placing means 48 is surely prevented from moving to the right in FIG. 1 beyond the scanning exposure movement limit position shown by the two-dot chain line 48B in FIG. 1).

Figure 20:
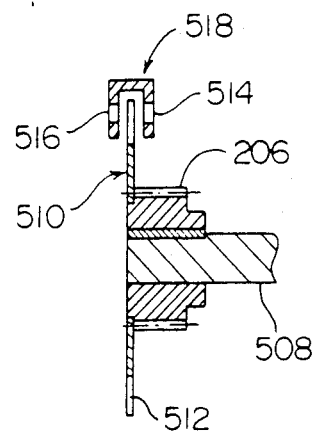
FIGS. 20 and 21 are a partial sectional view and a partical side elevation of constituent elements relating to means for detecting the amount of driving.
Figure 21:
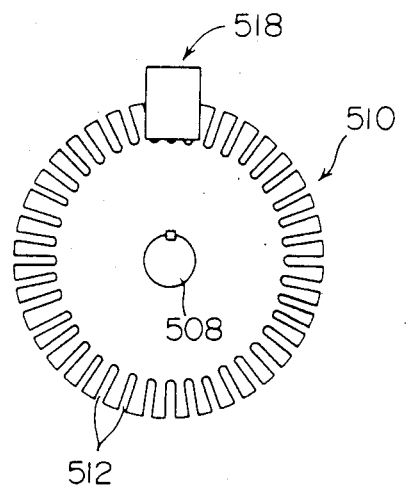

Furthermore, in the illustrated embodiment, there is provided a driving amount detecting means for detecting the amount of a rotating element which is always rotated when the driving source 144 (FIG. 3) is energized. With reference to FIGS. 20 and 21, a detection plate 510 and the gear 206 already referred to with reference to FIG. 3 are fixed to a shaft 508 to which the feed roller 112 (FIG. 1) is secured. A plurality of circumferentially spaced cuts 512 are formed in the peripheral edge portion of the detection plate 510. The driving amount detecting means is comprised of an optical detector 518 having a light emitting element 514 located on one side of the peripheral edge portion of the detection plate 510 and a light receiving element 516 located on the other side. The detector 518 generates a pulse signal every time the cut 512 is positioned between the light emitting element 514 and the light receiving element 516 during the rotation of the detection plate 510, and thereby the light receiving element 516 receives the light from the light emitting element 514 or the detection plate 510 shuts off the light from the light emitting element.

Figure 22:
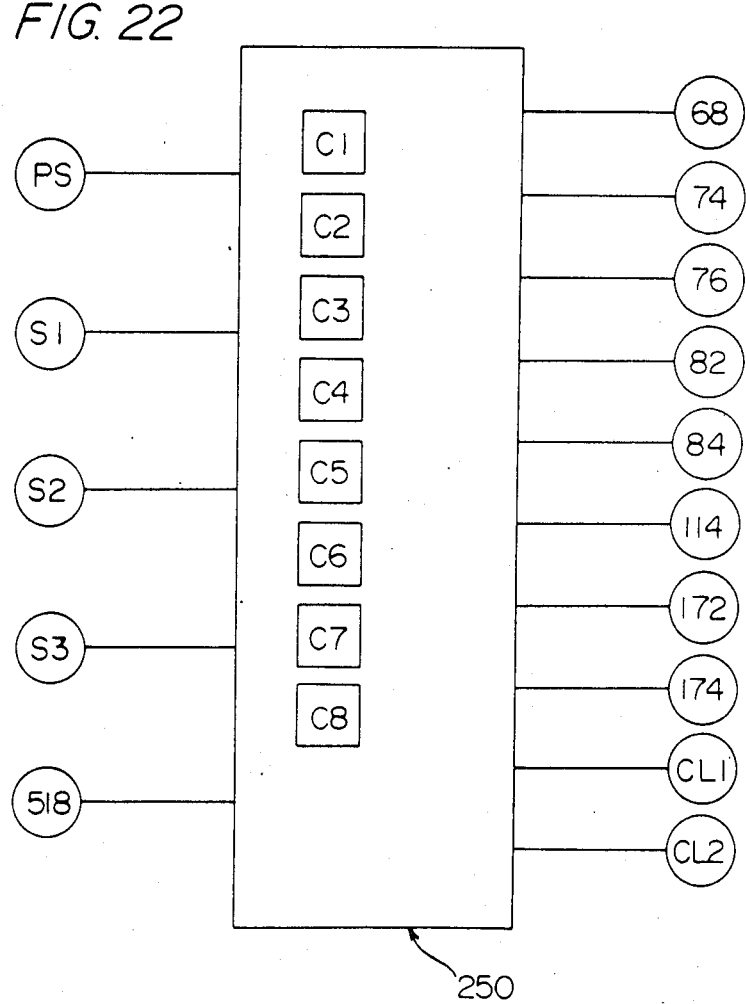
FIG. 22 is a block diagram showing elements relating to the controlling of the action of the electrostatic copying apparatus of FIG. 1.

With reference to FIG. 22, the detecting signals produced by the various detecting swtiches and detectors described above are fed into the control means 250 which may be a microprocessor, and the control means 250 controls the actuations of the various means of the copying apparatus according to the signals fed thereinto.

Figures 1, 23A:
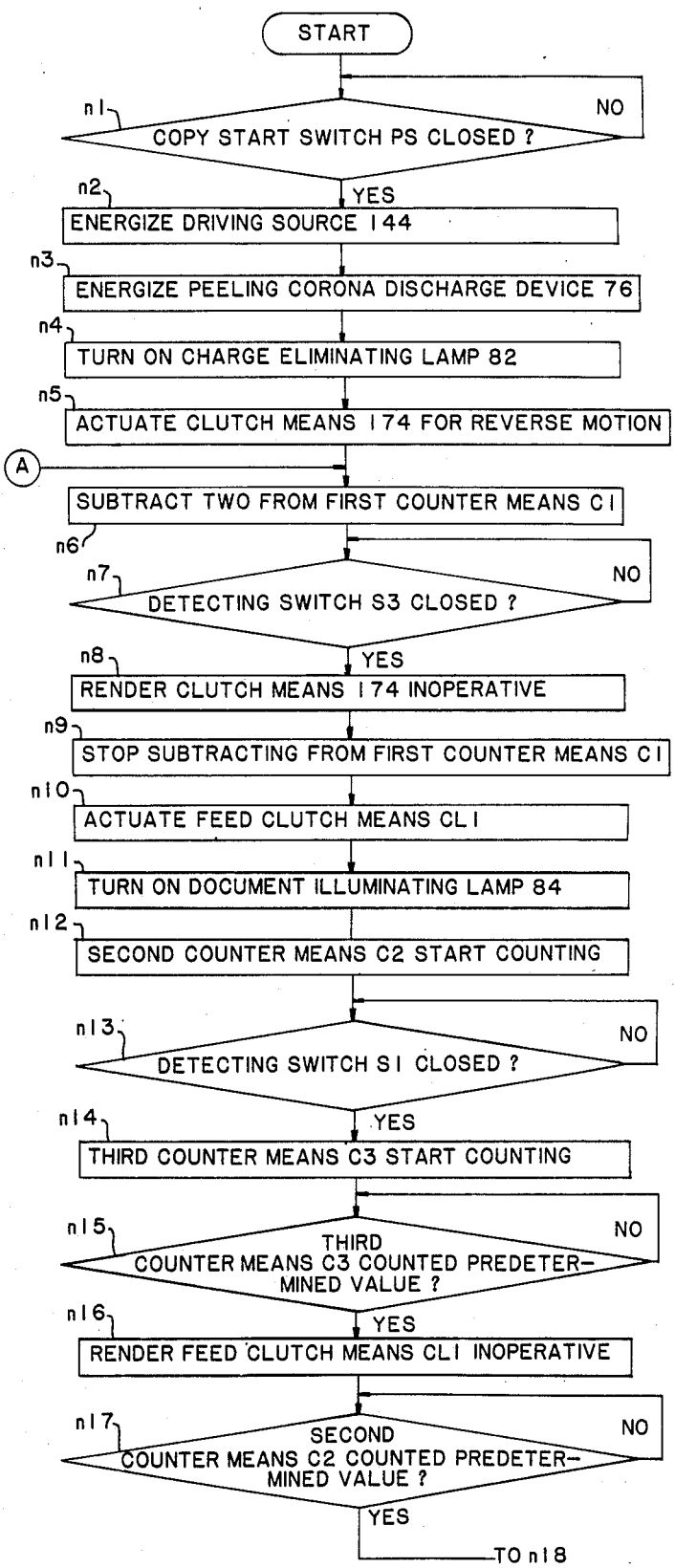

With reference to FIGS. 23-A and 23-B, the modes of controlling the various means of the copying apparatus will be described. In step n1, the copying start switch PS is closed to start a copying cycle. This results in energization of the driving source 144 in step n2, energization of the peeling corona discharge device 76 in step n3, lighting of the charge eliminating lamp 82 in step n4, and actuation of the clutch means 174 for reverse motion in the power transmission mechanism 166 in step n5. As a result, the document placing means 48 starts its preparatory movement from its stop position shown by the solid line in FIG. 1 to the left in FIG. 1 at a speed 2 V. Every time the detector 518 generates a pulse signal, a first counter means C1 built in the control means 250 subtracts 2 from the cumulative count in step n6 (as will be made clear from the following description, when the document placing means 48 starts to make a preparatory movement from its stop position, the first counter means C1 has a predetermined count). Then, in step n7, it is judged whether or not the detecting switch S3 is closed, and therefore whether the document placing means 48 has made a preparatory movement to the start-of-scan position shown by the two-dot chain line 48A in FIG. 1. When the detecting switch S3 is closed, step n8 sets in, and the clutch means 174 for reverse motion in the power transmission mechanism 166 for the document placing means 48 is rendered inoperative. Thus, the document placing means 48 is stopped at the start-of-scan position shown by the two-dot chain line 48A in FIG. 1. In step n9, the first counter means C1 stops subtraction from the cumulative count (at this time, the count of the first counter means C1 becomes zero unless errors have been accumulated). In step n10, a feed clutch means CL1 for connecting the feed roller 94 of the paper feed device 90 to the driving source 144 is actuated, and the feeding of a copying paper sheet from the paper cassette 100 is started. In step n11, the document illuminating lamp 84 is turned on. In step n12, a second counter means C2 built in the control means 250 starts to count the pulse signals generated by the detector 518. In step n13, it is judged whether or not the detecting switch S1 has been closed and therefore the leading edge of the sheet material fed from the copying paper cassette 100 has reached the detecting arm of the detecting switch S1. When the detecting switch S1 has been closed, step n14 sets in, and a third counter means C3 in the control means 250 starts to count the pulse signals generated by the detector 518. Then, in step n15, it is judged whether or not the third counter means C3 has counted a predetermined value. This predetermined value corresponds to the time which is required for the leading edge of the sheet material to reach the nip position of the conveyor rollers 120 and 122 after its arrival at the detecting arm of the detecting switch S1. When the third counter means C3 has counted the predetermined value, step n16 sets in, and the feed clutch means CL1 is rendered inoperative. Then, in step n17, it is judged whether or not the second counter means C2 which started counting in step n12 has counted a predetermined value. This predetermined value corresponds to the time required for the document illuminating lamp 84 turned on in step n11 to assume a stable state. When the second counter means C2 has counted the predetermined value, step n18 sets in, and the charging corona discharge device 68 is energized. In step n19, a fourth counter means C4 built in the control means 250 starts to count the pulse signals generated by the detector 518. Then, in step n20, it is judged whether or not the fourth counter means C4 has counted a predetermined value. This predetermined value corresponds to the sum of the time required for the charging corona discharge device 68 energized in step n18 to assume a stable state and the time required for a specified position of the photosensitive member on the rotating drum 64 to move by the rotation of the rotating drum 64 from a position at which it undergoes the action of the corona discharge device 68 to a position at which it is exposed through the optical unit 70. When the fourth counter means C4 has counted a predetermined value, step n21 sets in, and the count of the first counter means C1 is returned to zero if it is not zero owing to the accumulation of errors. In step n22, the clutch means 172 for normal motion in the power transmission mechanism 166 for the document placing means 48 is actuated, and the document placing means 48 starts to make a scanning exposure movement at a speed V to the right in FIG. 1 from its start-of-scan position shown by the two-dot chain line 48A in FIG. 1. In step n23, the first counter means C1 begins to add one to the cumulative count every time the detector 518 produces a pulse signal. Then, in step n24, it is judged whether or not the detecting switch S4 has been closed, and the document placing means 48 has been moved a predetermined distance to the right in FIG. 1 from the start-of-scan position shown by the two-dot chain line 48A in FIG. 1. When the detecting switch S4 has been closed, step n25 sets in, and a conveying clutch means CL2 for connecting the conveyor roller 122 to the driving source 114 is actuated, and consequently, conveying of the sheet material whose leading edge is at a stop while being in abutment against the nip position of the conveyor rollers 120 and 122 is started. In step n26, a fifth counter means C5 built in the control means 250 begins to count the pulse signals generated by the detector 518. Then, in step n27, it is judged whether or not the fifth counter means C5 has counted a predetermined value. This predetermined value corresponds to the time required for the leading edge of the sheet material whose conveying was started in step n26 to reach a position at which it undergoes the action of the transferring corona discharge device 74. When the fifth counter means C5 has counted the predetermined value, step n28 sets in, and the transferring corona discharge device 74 is energized. Then, in step n29, it is judged whether or not the detecting switch S1 has been opened and therefore whether the trailing edge of the sheet material has gone past the detecting arm of the detecting switch S1. When the detecting switch S1 has been opened, step n30 sets in, and the clutch means 172 of the power transmission mechanism 166 is rendered inoperative, and the scanning exposure movement of the document placing means 48 is terminated corresponding to the length of the sheet material. In step n31, the first counter means C1 stops making additions to the count. In step n32, the charging corona discharge device 68 is deenergized. In step n33, a sixth counter means C6 built in the control means 250 starts to count the pulse signals generated by the detector 518, and in step n34, a seventh counter means C7 built in the control means 250 begins to count the pulse signals generated by the detector 518. Then, in step n35, it is judged whether or not the sixth counter means C6 has counted a predetermined value. This predetermined value corresponds to the time required for the trailing edge of the sheet material to go past the position at which it undergoes the action of the corona discharge device 74, after going past the detecting arm of the detecting switch S1. When the sixth counter means C6 has counted the predetermined value, step n36 sets in, and the corona discharge device 74 is deenergized. In step n37, the conveying clutch means CL2 is rendered inoperative. Then, step n38 sets in, and it is judged whether or not the seventh counter means C7 has counted a predetermined value. This predetermined value corresponds to the time interval which is desired so as to prevent vibration, etc. during the time period which runs from the time of rendering the clutch means 172 inoperative to the time of rendering the clutch means 174 operative. When the seventh counter means C7 has counted the predetermined value, step n39 sets in, and the document illuminating lamp 84 is turned off. In step n40, the clutch means 174 for reverse motion in the power transmission means 166 is actuated, and consequently, the document placing means 48 begins to make a returning movement at a speed 2 V to the left in FIG. 1. Then, in step n41, it is judged whether or not the copying cycle should be performed repeatedly. When the copying step is to be repeated, one goes back to step n6. When the copying cycle should not be repeated, step n 42 sets in, and the first counter means C1 begins to subtract 2 from the cumulative count every time the detector 518 produces a pulse signal. Then in step n43, it is judged whether or not the count of the first counter means C1 has been subtracted to a predetermined value. This predetermined value corresponds to the distance of movement between the stop position of the document placing means 48 shown by the solid line in FIG. 1 and its start-of-scan position shown by the two-dot chain line 48A in FIG. 1. When the count of the first counter means C1 has been subtracted to the predetermined value, step n44 sets in, and the clutch means 174 for reverse motion in the power transmission mechanism 166 is rendered inopeative. Thus, the document placing means 48 can be stopped at the stop position with a sufficient accuracy without the need for a detecting switch for detecting the occupation of the stop position by the document placing means 48. In step n45, the first counter means C1 stops subtraction. In step n46, an eighth counter means C8 built in the control means 250 starts to count the pulse signals generated by the detector 518. Then, in step n47, it is judged whether or not the eighth counter means C8 has counted a predetermined value. This predetermined value may correspond to the time required for the rotating drum 64 to rotate further through about one turn after the transferring operation. When the eighth counter means C8 has counted the predetermined value, step n48 sets in, and the driving source 144 is deenergized. In step n49, the peeling corona discharge device 76 is deenergized, and in step n50, the charge eliminating lamp 82 is turned off.

The aforesaid controlling mode is applicable when the sheet material is automatically fed from the copying paper feed device 90. When the sheet material is to be inserted manually to the manual feed device 92, the controlling mode differs in the following respects. Firstly, in step n1, instead of judging whether or not the copying start switch PS is closed, it is judged whether or not the detecting switch S2 has been closed and therefore the leading edge of the sheet material inserted manually has arrived at the detecting arm of the detecting switch S2. Secondly, steps n10, n14, n15 and n16 are omitted. Otherwise, the controlling mode is substantially the same as that described hereinabove. The feed rollers 110 and 112 of the manual feed device 92 are kept rotating even after the leading edge of the sheet material fed by it is stopped while being in abutment against the nip position of the conveyor rollers 120 and 122. Since, however, the feed roller 110 is pressed relatively lightly against the feed roller 112 by its own weight, the feed rollers 110 and 112 slip with respect to the sheet material when it is stopped with its leading edge in abutment against the aforesaid nip position. Thus, the feed rollers 110 and 112 do not adversely affect the sheet material.

The electrostatic copying apparatus improved in accordance with this invention has been described in detail hereinabove with reference to its preferred embodiments shown in the accompanying drawings. It should be understood however that the invention is is not limited to these specific embodiments, and various changes and modifications are possible without departing from the scope of the invention.

What we claim is:

1. An electrostatic copying apparatus comprising a document placing means being reciprocally mounted and having a transparent plate for placing a document thereon, a driving source, a power transmission mechanism including a clutch means for normal motion and a clutch means for reverse motion for drivingly coupling the driving source to the document placing means, a driving amount detecting means for detecting the amount of rotation of a rotating element adapted to be rotated when the driving source is energized, and a control means for actuating the clutch means for normal motion to move the document placing means for scanning exposure in a predetermined direction from a predetermined start-of-scan position in a copying cycle, and renders the clutch means for normal motion and simultaneously with it or after it, actuates the clutch means for reverse motion to move the document placing means in the reverse direction; wherein said control means renders the clutch means for reverse motion inoperative, and thereby stops the document placing means at a predetermined stop opposition, when the amount of rotation of the rotating element during the scanning exposure movement of the document placing means is in a predetermined relation to the amount of rotation of the rotating element after the starting of the returning movement of the document placing means.

2. The apparatus of claim 1 wherein the control means at the time of the copying cycle first actuates the clutch means for reverse motion to cause the document placing means to make a preparatory movement from said stop position in the reverse direction, and when the document placing means has made a preparatory movement to the start-of-scan position, the control means renders the clutch means for reverse motion inoperative.

3. The apparatus of claim 1 wherein the control means renders the clutch means for normal motion inoperative when the document placing means has made a scanning exposure movement over a distance corresponding to the length of a copying paper in said predetermined direction from said start-of-scan position.

4. The apparatus of claim 1 wherein the rotating element is a detection plate having a plurality of circumferentially spaced cuts formed in its peripheral edge portion; the driving amount detecting means includes a detector having a light emitting element located on one side of the peripheral edge portion of the detection plate and a light receiving element located on the other side and produces a pulse signal every time the light receiving element receives the light from the light emitting element by the positioning of the cut between the light emitting element and the light receiving element or every time the light from the light emitting element is shut off by the detection plate; and said control means renders the clutch means for reverse motion inoperative when the number of pulse signals produced by the driving amount detecting means during the scanning exposure movement of the document placing means is in a predetermined relation to the number of pulses produced by the driving amount detecting means after the document placing means has started to make a returning movement.

5. The apparatus of claim 4 wherein said control means includes counter means for performing addition every time the driving amount detecting means produces a pulse signal during the scanning exposure movement of the document placing means and performing subtraction every time the driving amount detecting means produces a pulse signal during the returning movement of the document placing means, and when the count of the counter is subtracted to a predetermined value, said control means renders the clutch means for reverse motion inoperative.

6. The apparatus of claim 5 wherein when the clutch means for normal motion is actuated, the document placing means is moved in said predetermined direction at a speed V, and when the clutch means for reverse rotation is actuated, the document placing means is moved in said reverse direction at a speed 2 V, and said counter means adds one to the cumulative count every time the driving amount detecting means produces a pulse signal during the movement of the document placing means in said predetermined direction, and subtracts 2 from the cumulative count every time the driving amount detecting means produces a pulse signal during the movement of the document placing means in the reverse direction.

7. The apparatus of claim 5 wherein when the document placing means is held at the start-of-scan position, the counter means is necessarily reset to zero.

* * * * *